United States Patent
Colombo et al.

(10) Patent No.: US 9,134,726 B2
(45) Date of Patent: Sep. 15, 2015

(54) METHOD FOR CONFIGURATION SOA-BASED AUTOMATION DEVICES AND FOR DEVELOPING AN ORCHESTRATION MACHINE, PRODUCTION METHOD AND PRODUCTION SYSTEM IN SERVICE-ORIENTED ARCHITECTURE HAVING EMBEDDED SERVICE ORCHESTRATION ENGINE

(75) Inventors: Armando Walter Colombo, Hinte (DE); Joao Marco Mendes, Ponte de Lima (PT); Axel Bepperling, Frankfurt (DE)

(73) Assignee: SCHNEIDER ELECTRIC AUTOMATION GMBH, Seligenstadt (DE)

( * ) Notice: Subject to any disclaimer, the term of this patent is extended or adjusted under 35 U.S.C. 154(b) by 786 days.

(21) Appl. No.: 13/395,160

(22) PCT Filed: Sep. 9, 2010

(86) PCT No.: PCT/EP2010/063264
§ 371 (c)(1),
(2), (4) Date: Jun. 22, 2012

(87) PCT Pub. No.: WO2011/029887
PCT Pub. Date: Mar. 17, 2011

(65) Prior Publication Data
US 2012/0265324 A1 Oct. 18, 2012

(30) Foreign Application Priority Data
Sep. 9, 2009 (DE) .................... 10 2009 043 968

(51) Int. Cl.
*G05B 19/418* (2006.01)

(52) U.S. Cl.
CPC ...... *G05B 19/41885* (2013.01); *G05B 19/4188* (2013.01); *G05B 2219/31196* (2013.01); *G05B 2219/32136* (2013.01); *G05B 2219/32379* (2013.01)

(58) Field of Classification Search
CPC .............. G05B 19/4188; G05B 19/41885; G05B 2219/31196; G05B 2219/32136; G05B 2219/32379
USPC ................................................ 700/29, 110
See application file for complete search history.

(56) References Cited

U.S. PATENT DOCUMENTS 6,076,952 A * 6/2000 Gretta et al. .............. 700/83
2010/0292810 A1 11/2010 Colombo et al.

OTHER PUBLICATIONS

Colombo et al., WO2009053472 (machine translation), pp. 1-4.*

(Continued)

*Primary Examiner* — Kenneth M Lo
*Assistant Examiner* — Derrick Boateng
(74) *Attorney, Agent, or Firm* — Ladas & Parry LLP

(57) ABSTRACT

A method for configuring an automation device or simulator for controlling mechatronics components of an automation system, including: generating HLPN component models for each type of the mechatronic components of the automation system, creating a component instance model from an HLPN component model for each physically present mechatronic component, creating a layout configuration file, which describes relationships of the component instance models to be connected, composing the component instance models into a system model based on the layout configuration file, wherein logic ports of the component instance models are connected/linked to each other, generating configuration files based on a system model and device description files and WSDL files of the component instance models, loading the configuration files into the automation device or simulator containing the HLPN orchestration machine, and executing the configuration files by the HLPN orchestration machine of the automation device or the simulator.

12 Claims, 35 Drawing Sheets

Modular design of the assembly system

(56) References Cited

OTHER PUBLICATIONS

Figure 1:
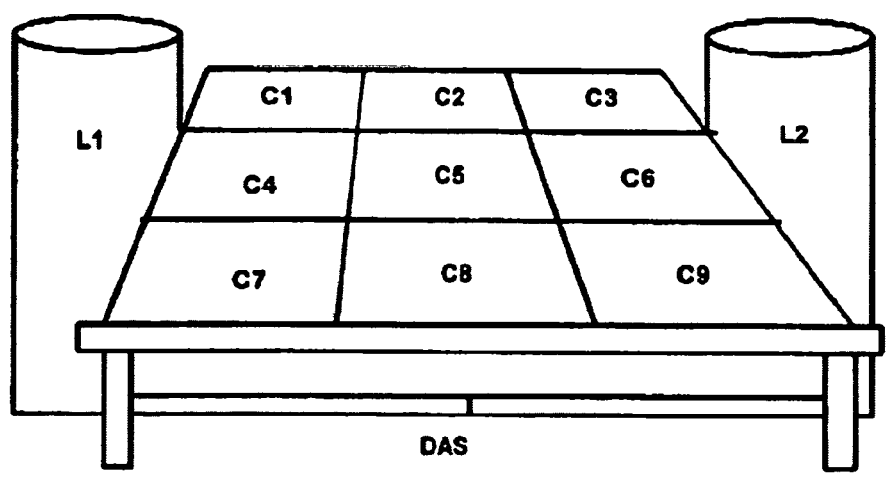

Andrei Lobov, et al.: "Service Oriented Architecture in Developing of Loosely-coupled Manufacturing Systems" The IEEE International Conference on Industrial Informatics, Jul. 13, 2008, pp. 791-796, XP-031316137.

J. Marco Mendes, et al.: "High-Level Petri Nets Control Modules for Service-Oriented Devices: A Case Study", Industrial Electronics, 34th Annual Conference of IEEE, IEEE, Nov. 10, 2008, pp. 1487-1492, XP-031825637.

J. Marco Mendes, et al.: "Software Methodologies for the Engineering of Service-Oriented Industrial Automation: The Continuum Project", 33rd Annual IEEE International Computer Software and Applications Conference, Jul. 20, 2009, pp. 452-459, XP-031529555.

J. Marco Mendes, et al.: "Composition of Petri Nets Models in Service-oriented Industrial Automation", 2010 8th IEEE International Conference on Industrial Informatics (INDIN), Jul. 13, 2010, pp. 578-583, XP031733672.

\* cited by examiner

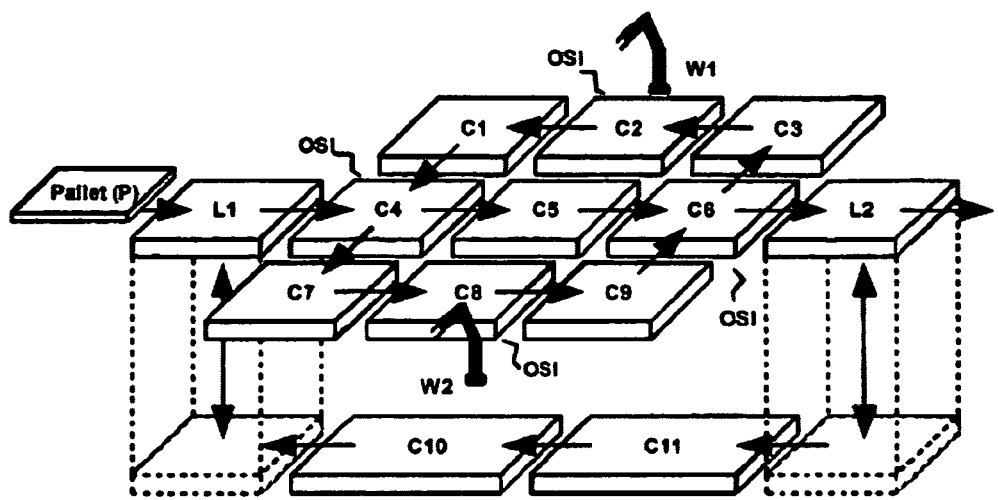
Fig. 3 – Modular design of the assembly system

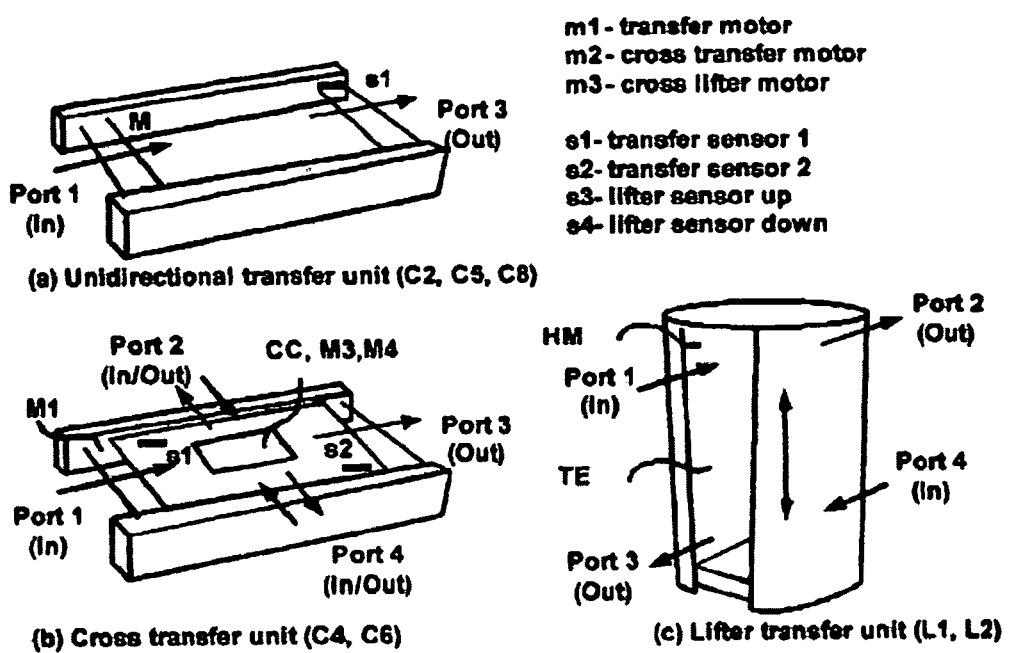
Fig. 4 – Types of transfer units

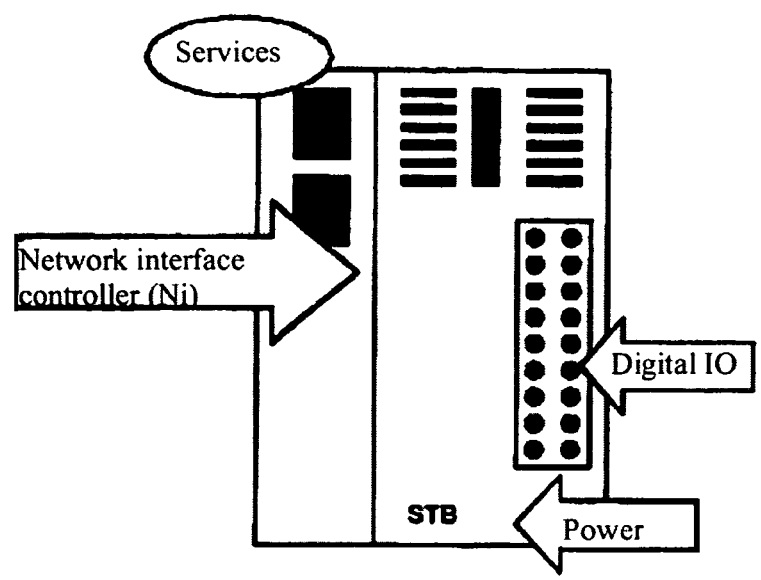
Fig. 5 – Advantys STB NIP2311 with I/O module(s).

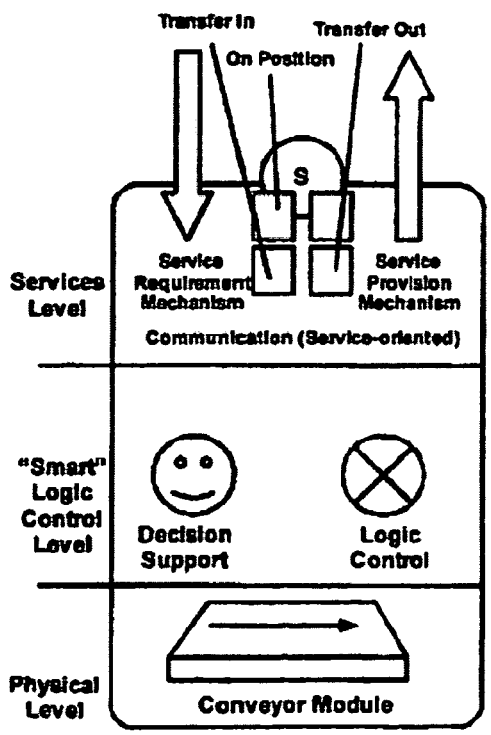
Fig. 6 – Intelligent mechatronic components are components of an SOA-based automation system.

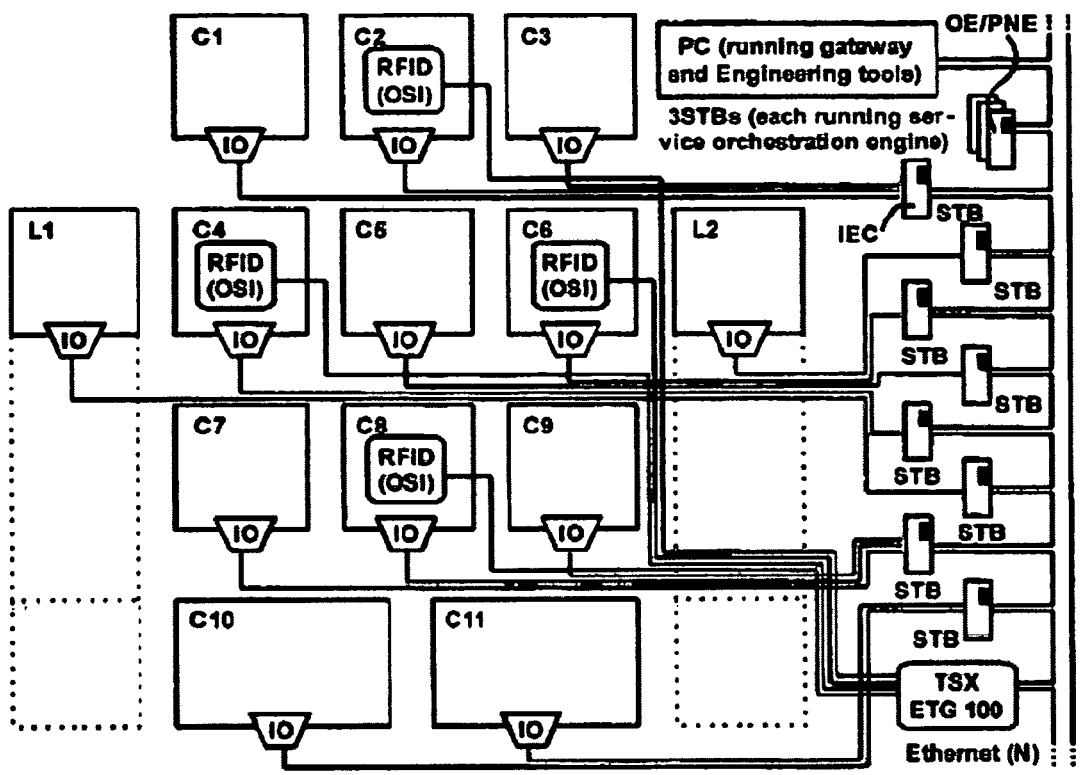
Fig. 7 – Connection of the devices.

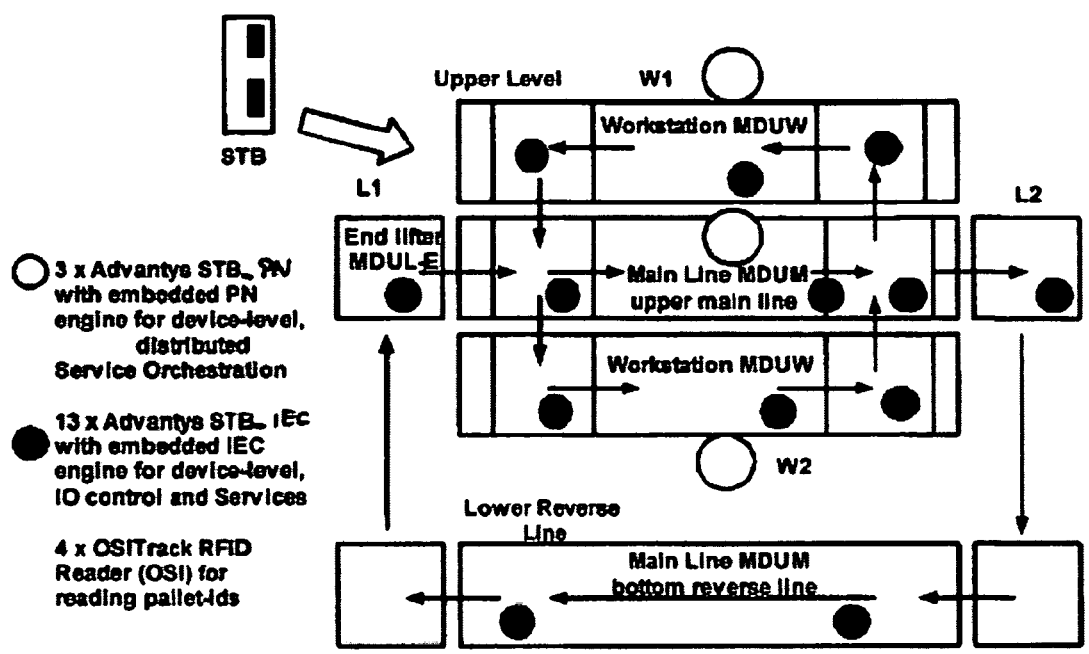
Fig. 8 – Use of Advantys STBs and OSITrack RFID readers in the system.

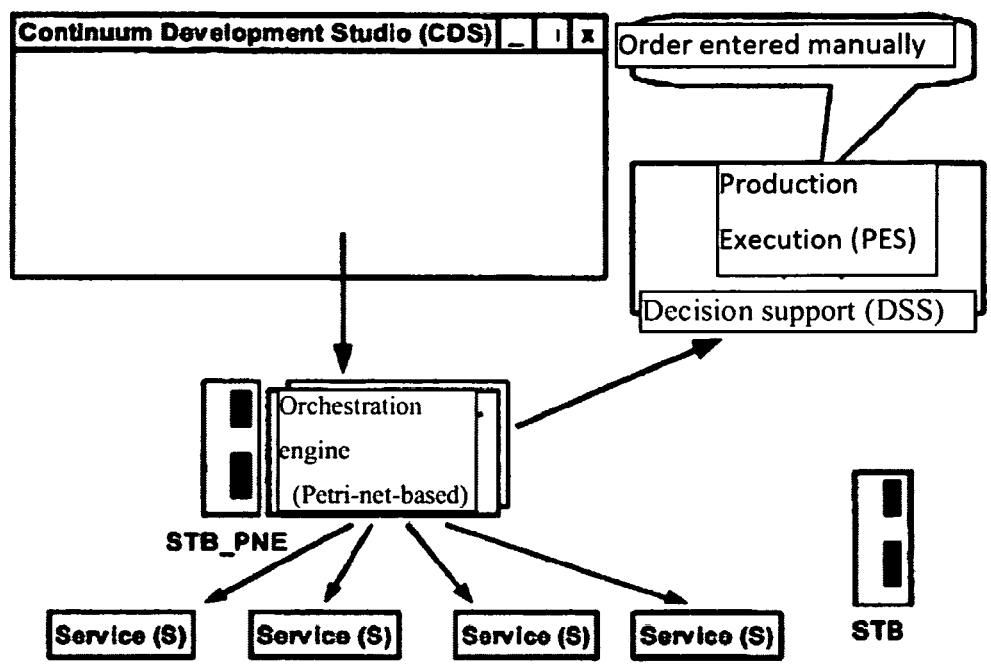
Figure 9. – Approach to service orchestration.

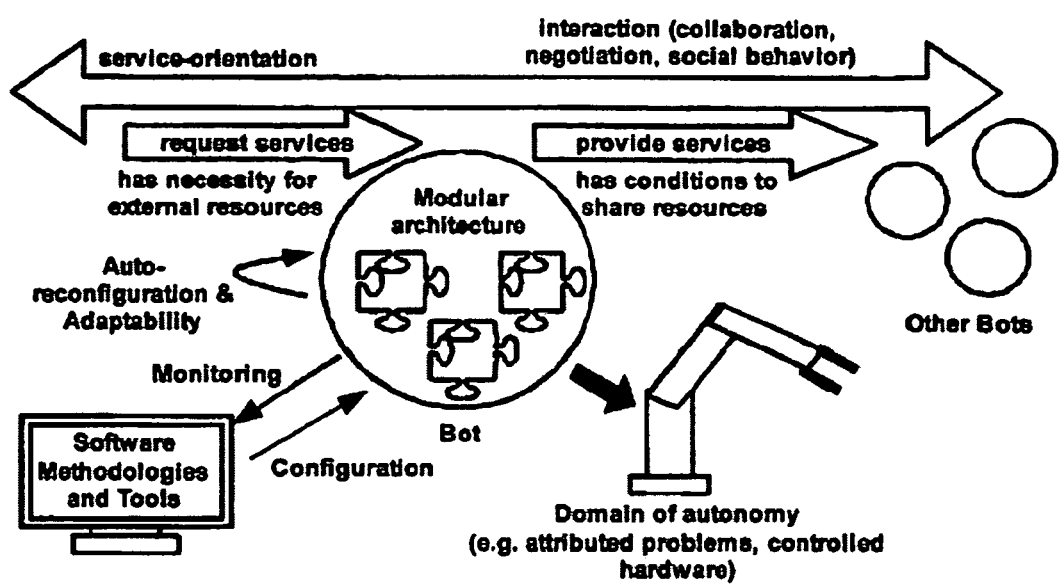
Fig. 10 – Concept of the automation bot.

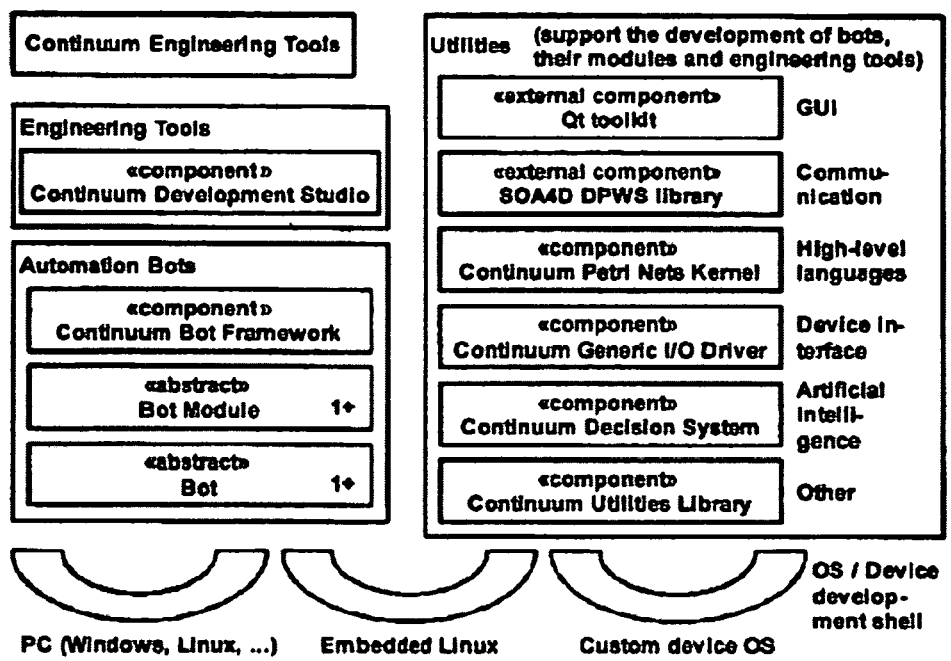
Fig. 11 – Main software component of the continuum project.

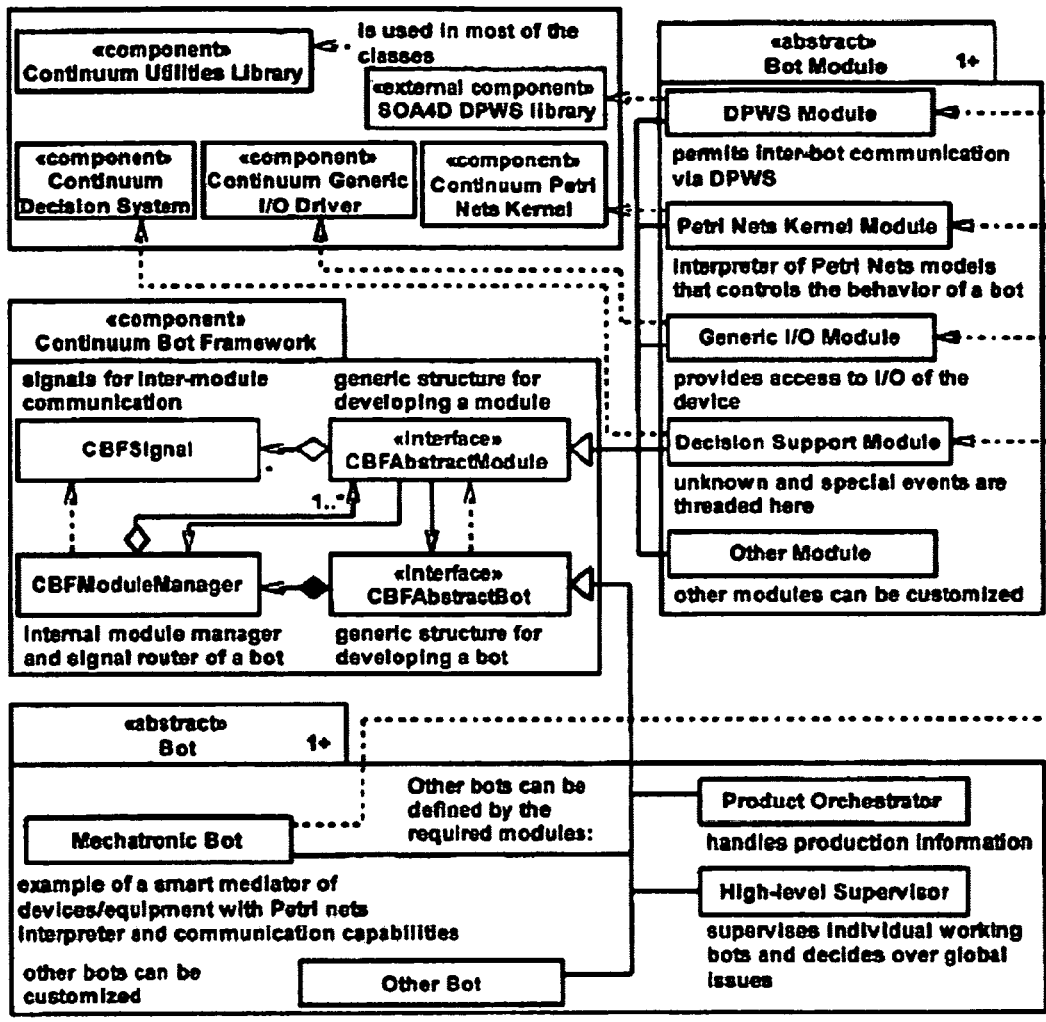
Fig. 12 - Class diagram and implementations of the continuum bot framework.

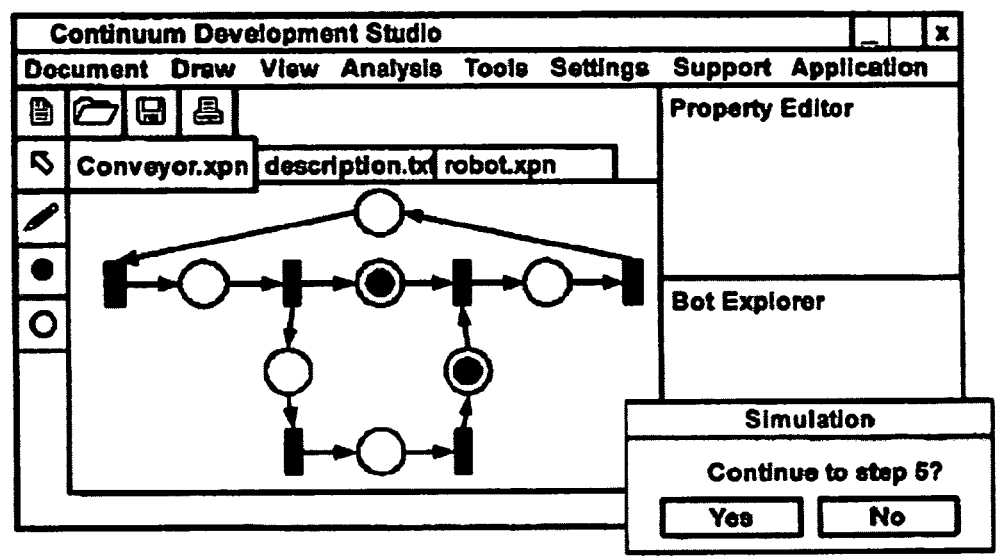
Fig. 13 – Continuum development studio with simulated Petri net.

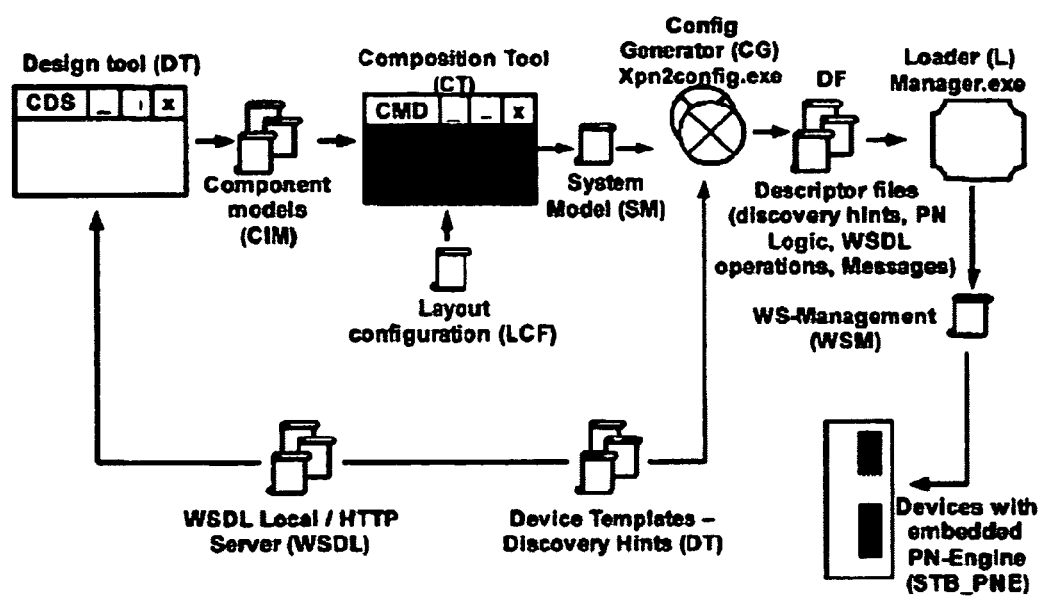
Fig. 14 – Configuration and use tools.

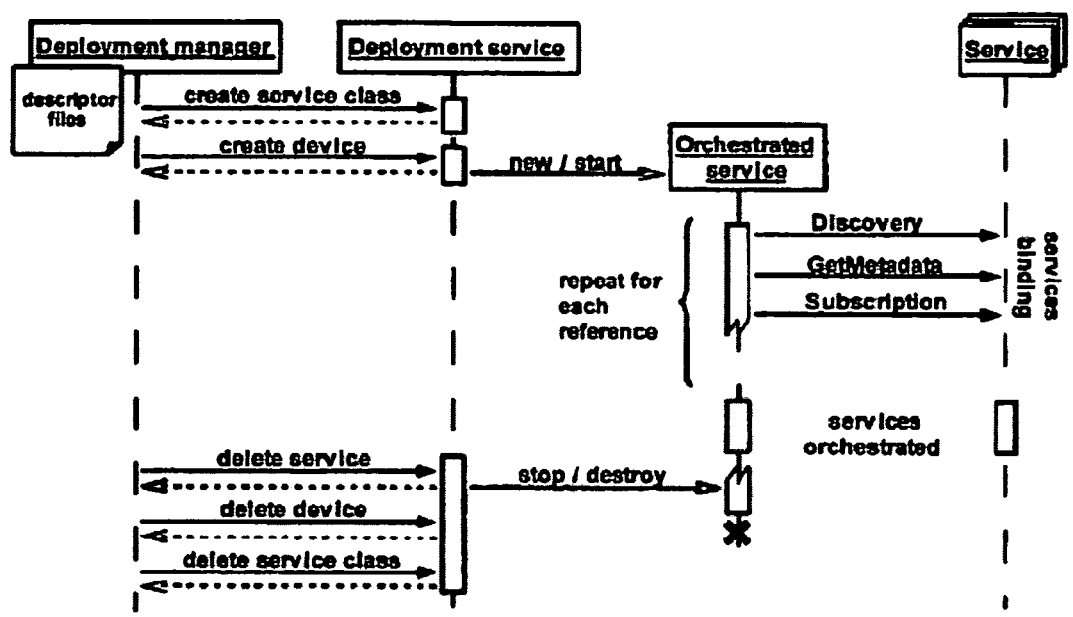
Fig. 15 – Configuration and deployment, service view.

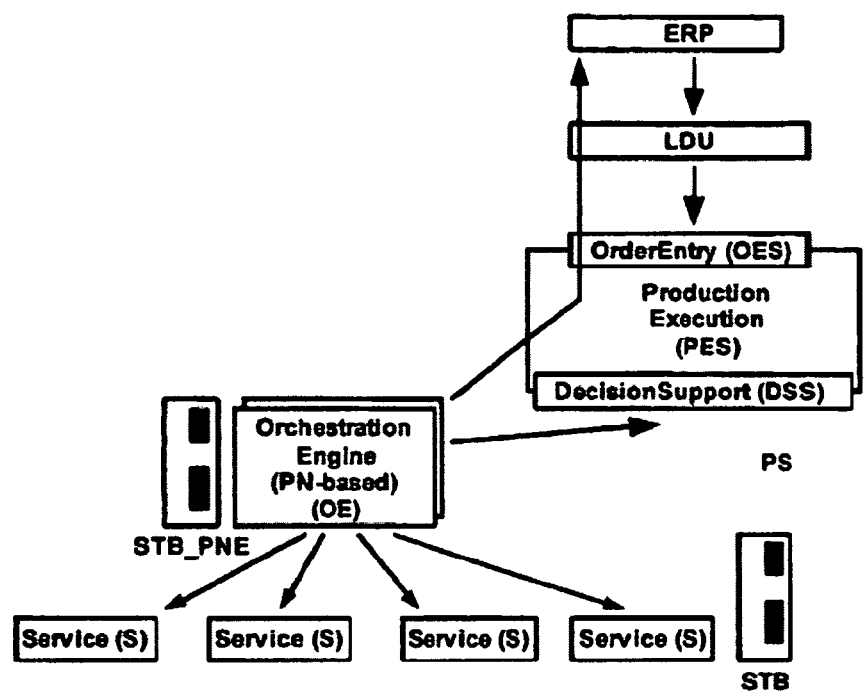
Fig. 16 – Overview of production execution.

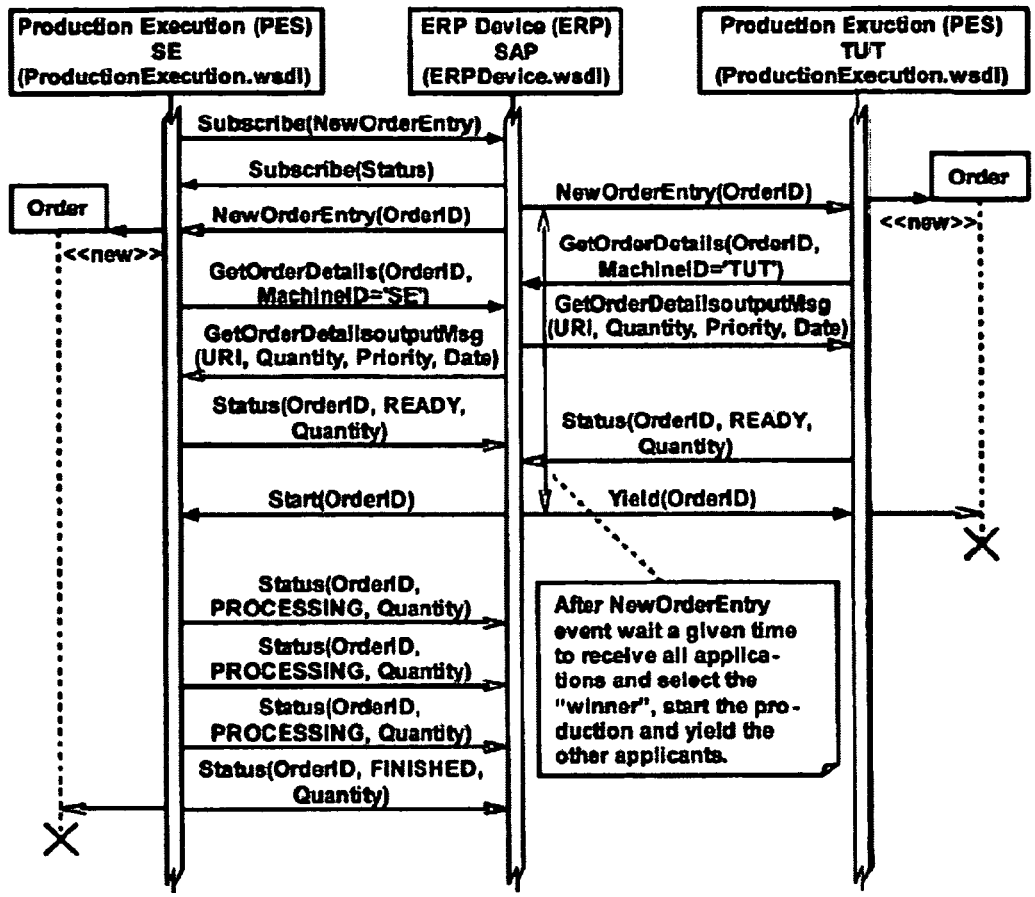
Fig. 17 – Creating a new order and notifying the ERP system during production.

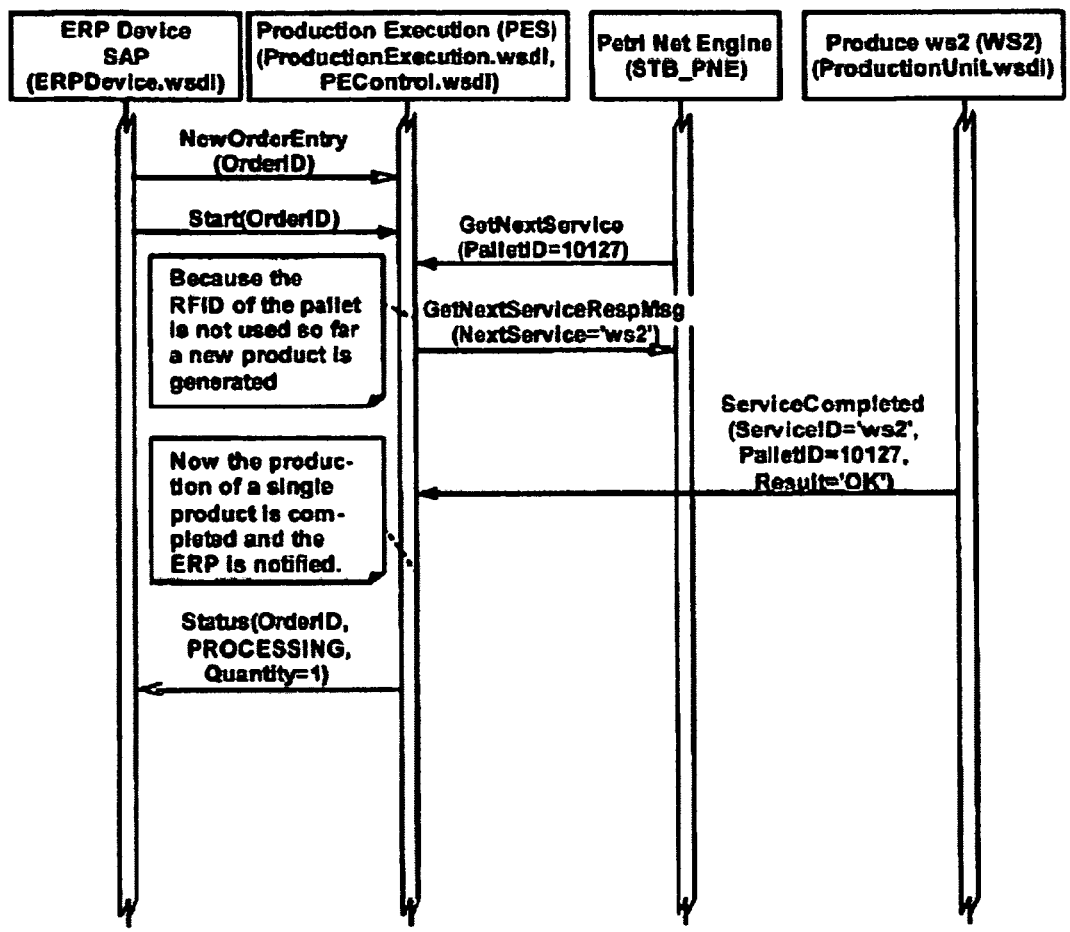
Fig. 18 – Notifying the ERP system when a single product is manufactured.

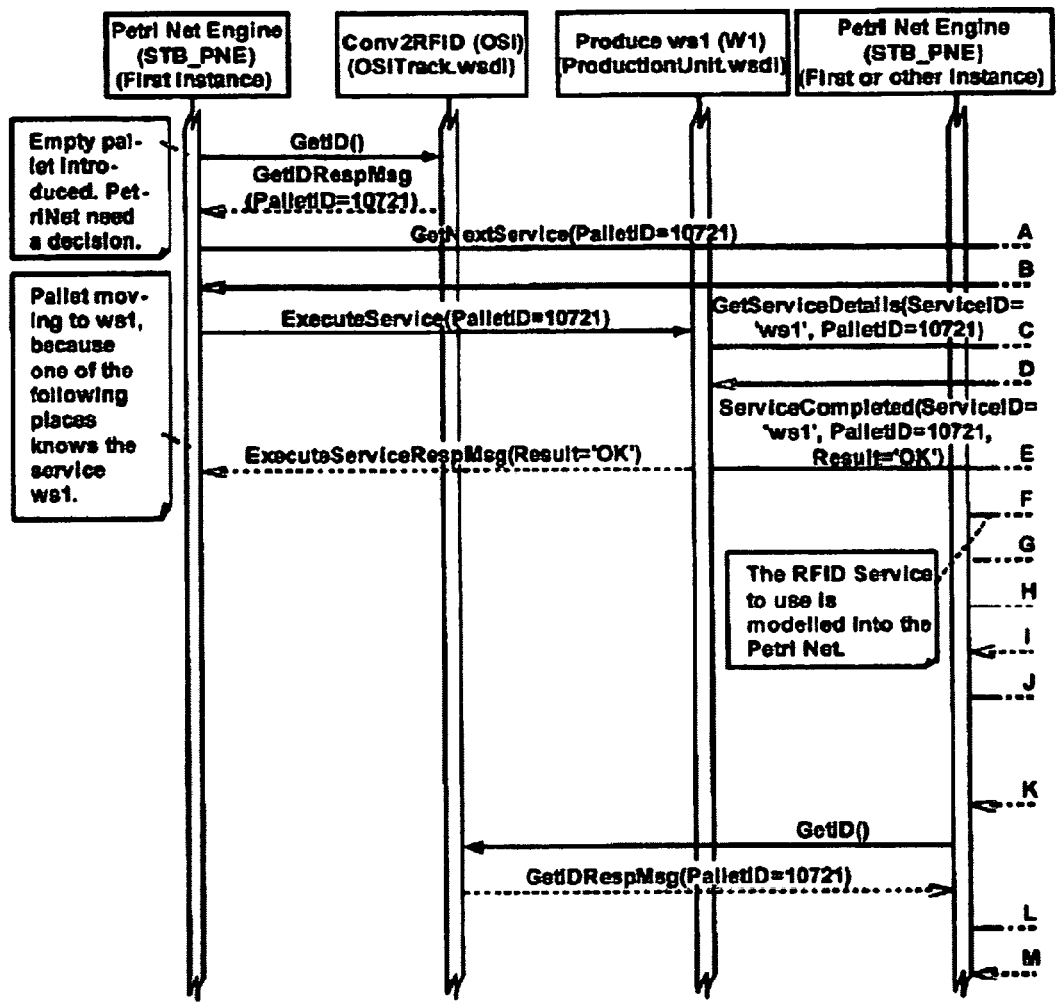
Fig. 19-Complete production with input and output at workstation 1 and production at workstation 2.

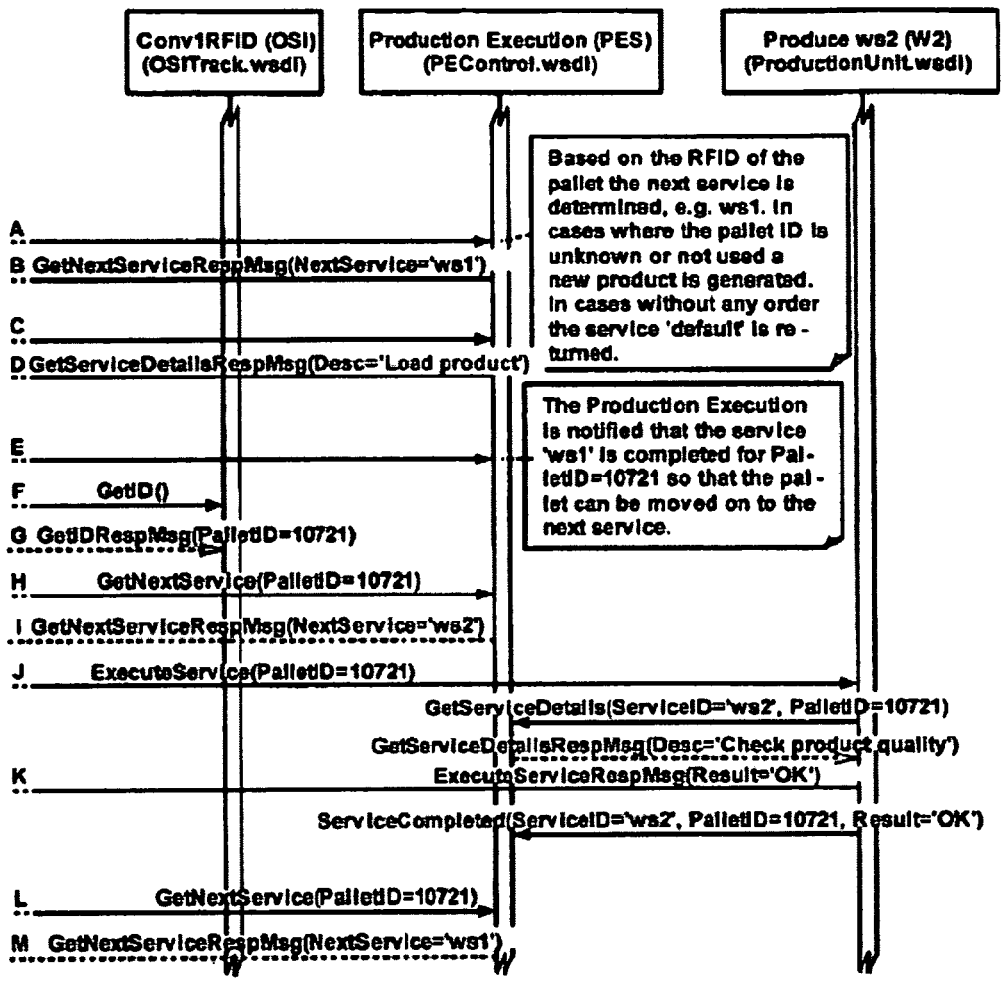
Fig. 19 continued - Complete production with input and output at workstation 1 and production at workstation 2.

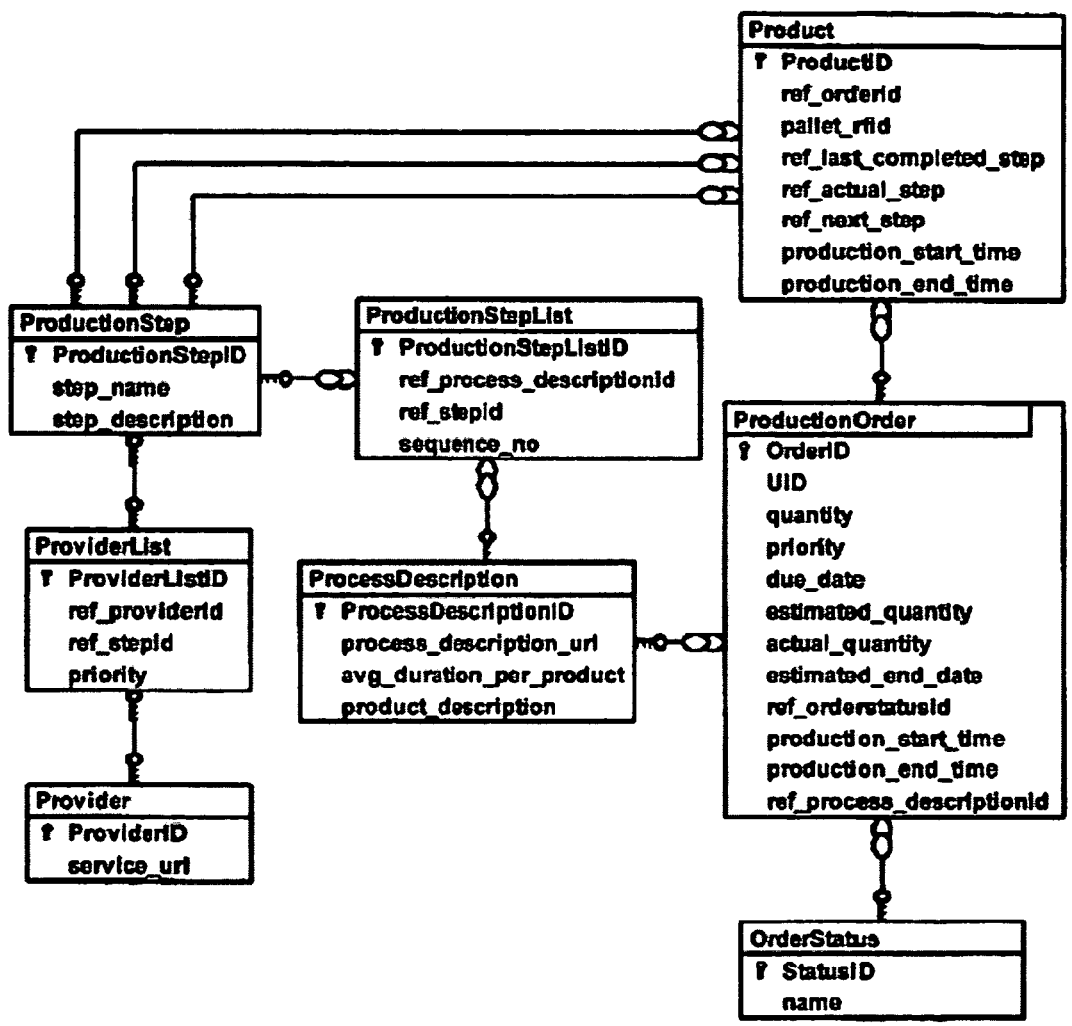
Fig. 20 – Structure of the database of the production execution system.

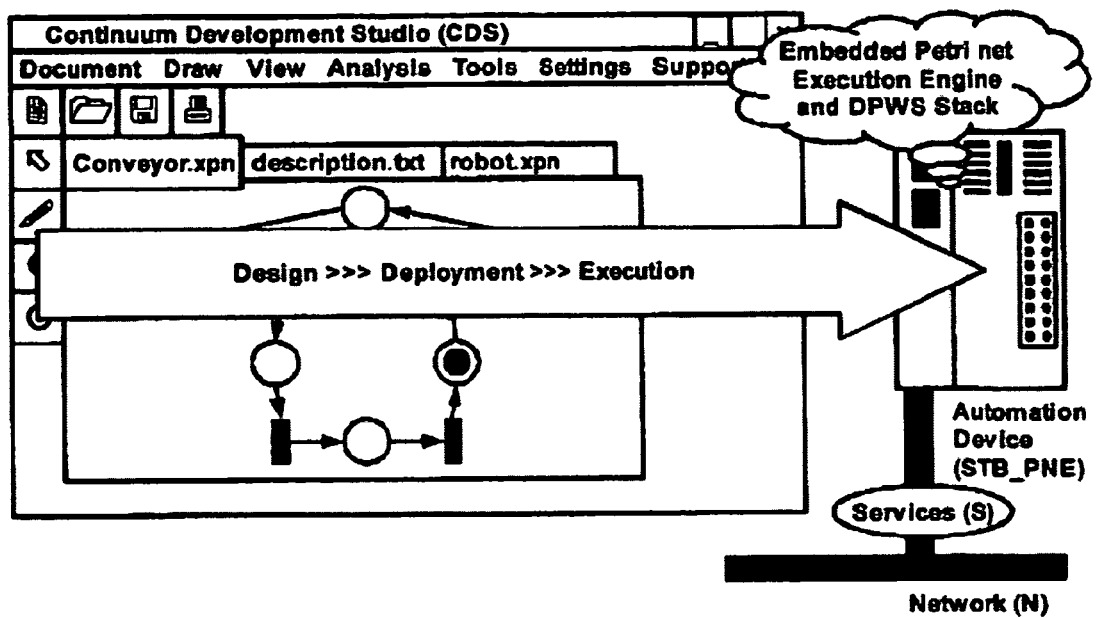
Fig. 21 – Petri-net-based orchestration tools and engineering.

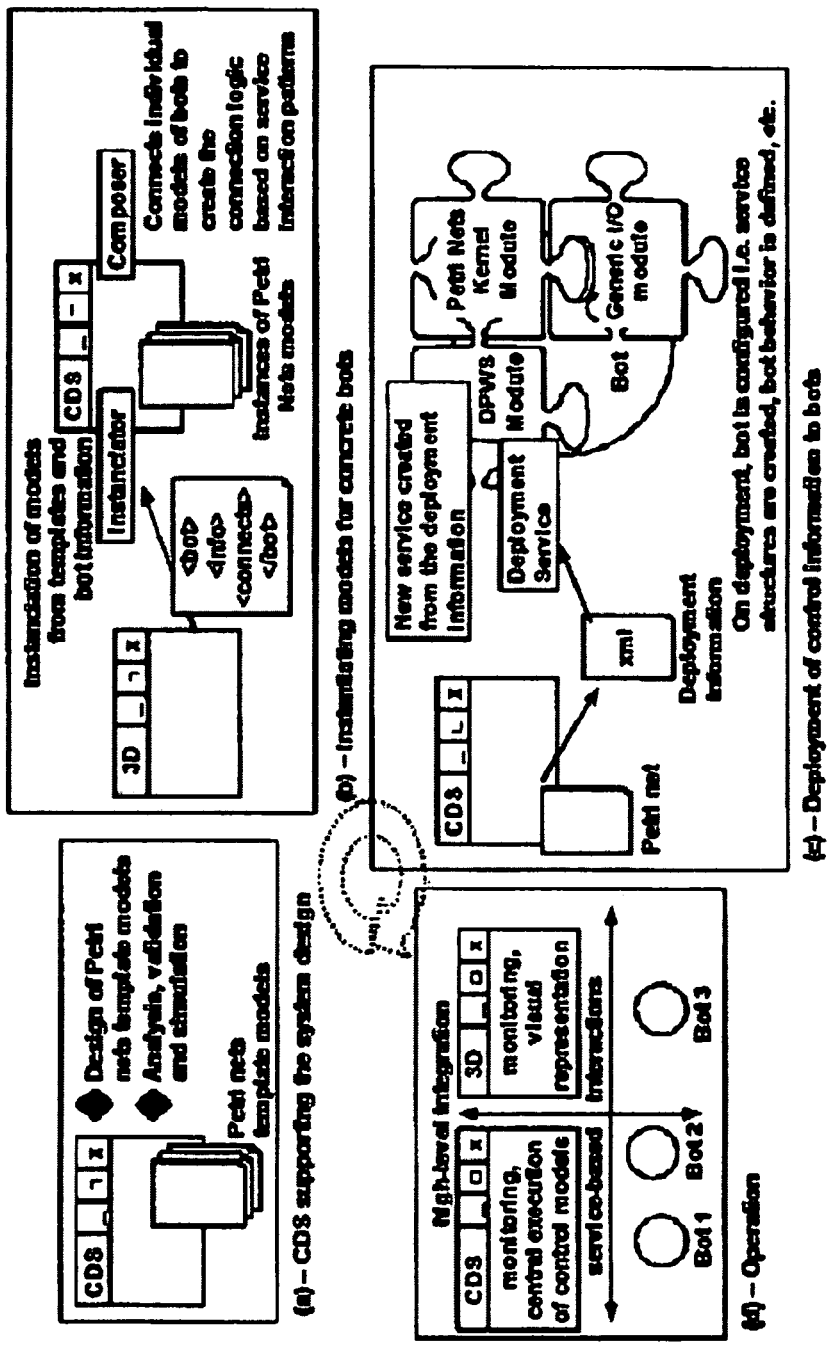
Fig. 22 - Engineering steps with a continuum approach.

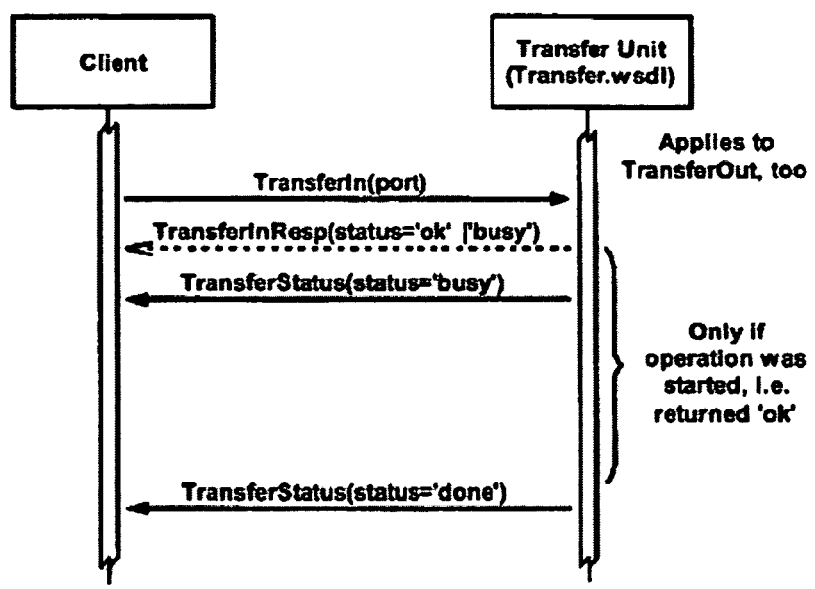
Fig. 23 – Message sequence for operational processes of the transfer units.

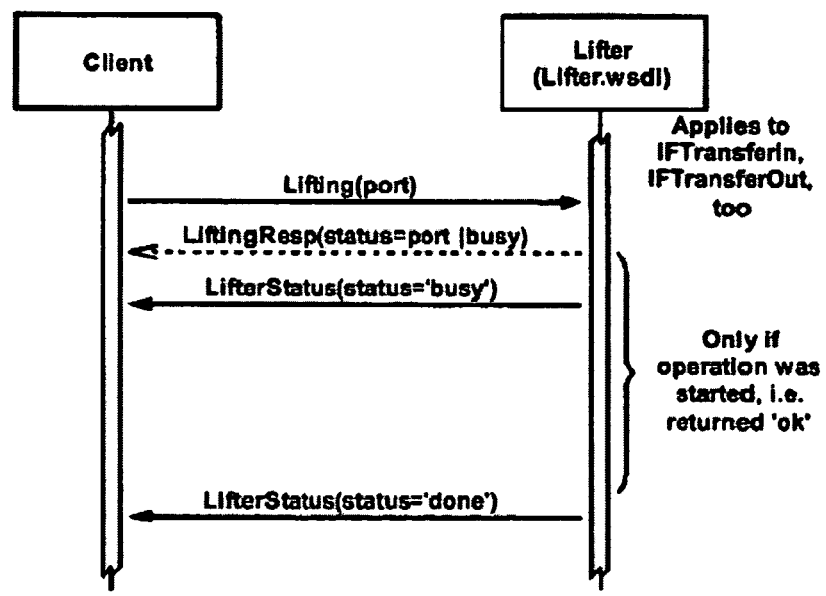
Fig. 24 – Message sequence for operational processes of the lifters.

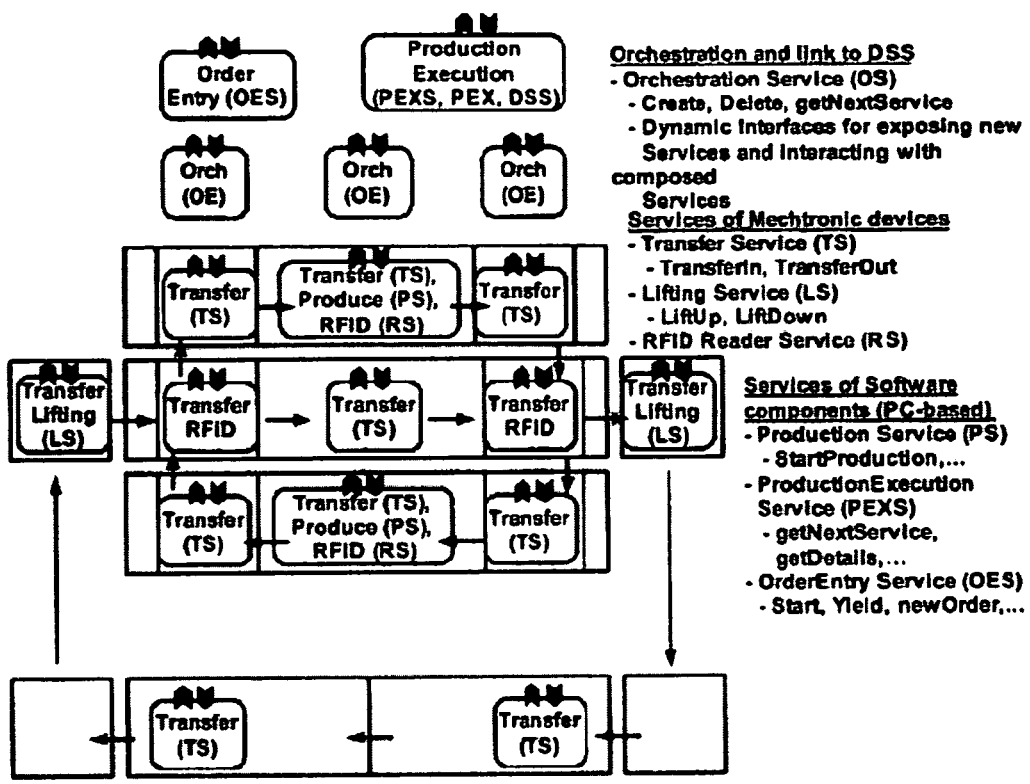
Fig. 25 – Service landscape of the system.

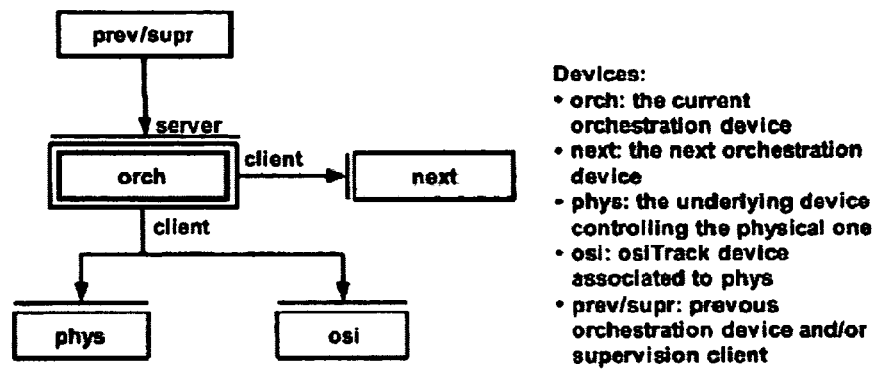
Fig. 26 – Device connection approach on the basis of the distributed dynamic orchestration approach.

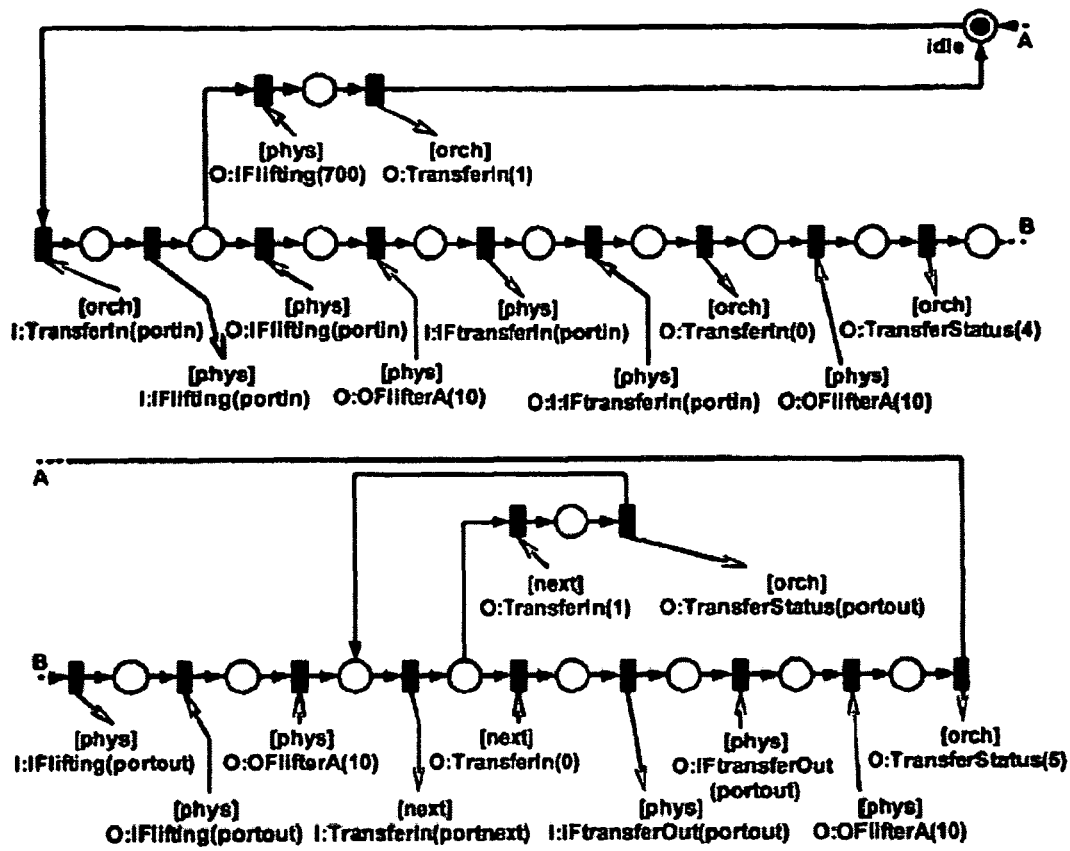
Fig. 27a – Orchestration of transfer units.

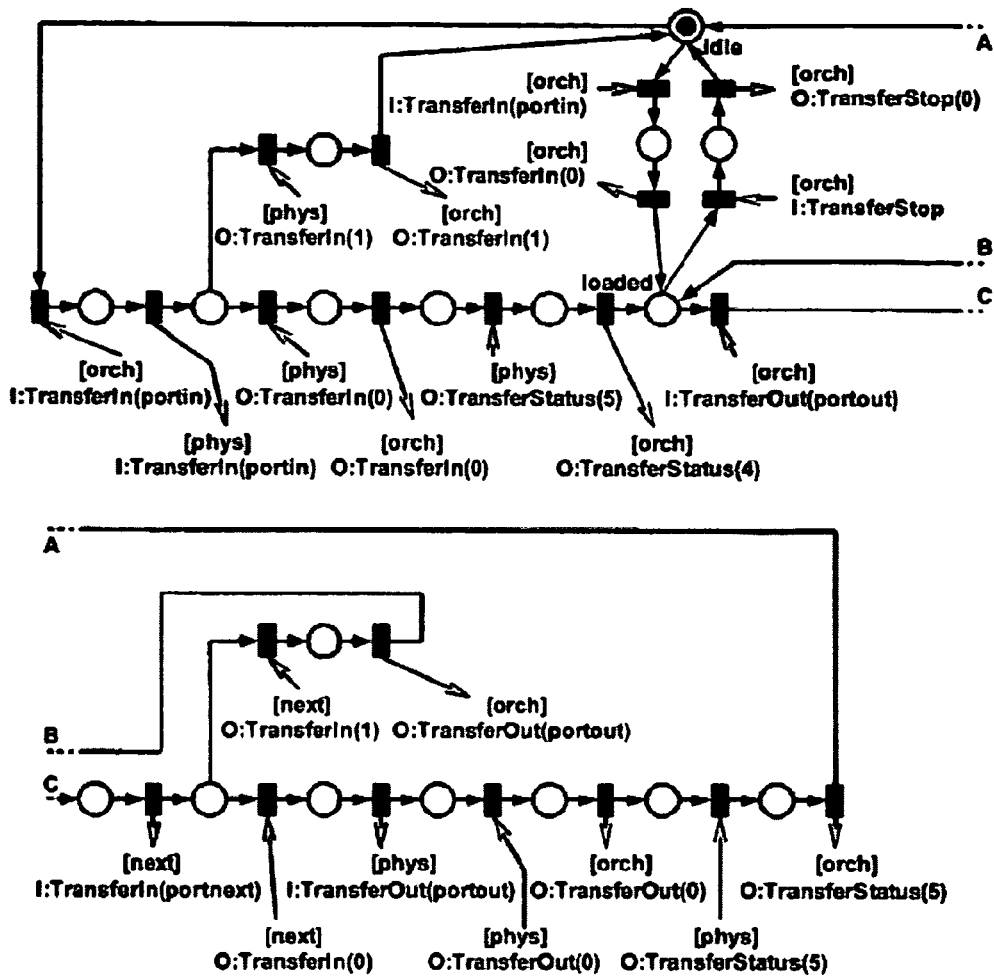
Fig. 27b – Orchestration of lifters.
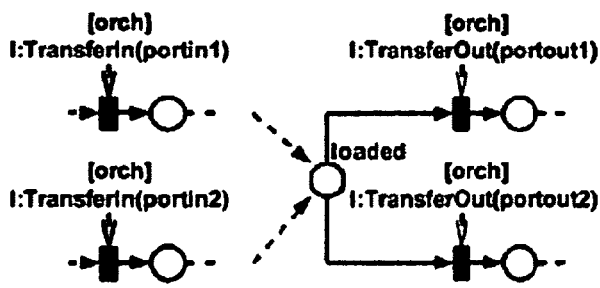
Fig. 27c.

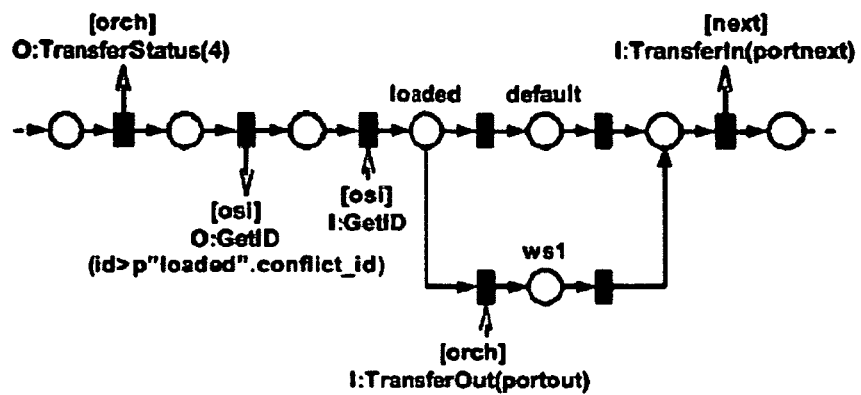
Fig. 27d.
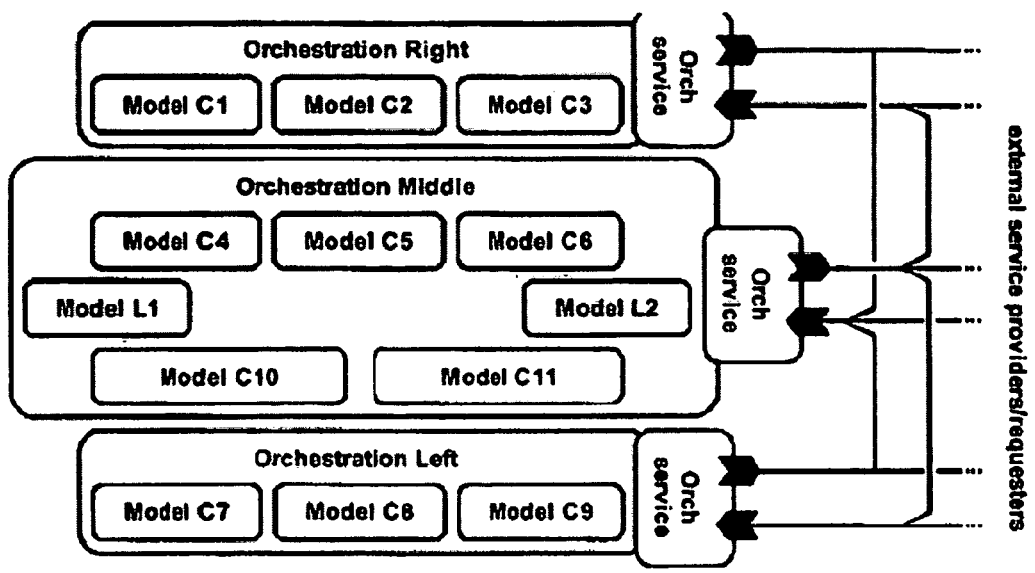
Fig. 28 – Connection of behavior models and generating orchestration services.

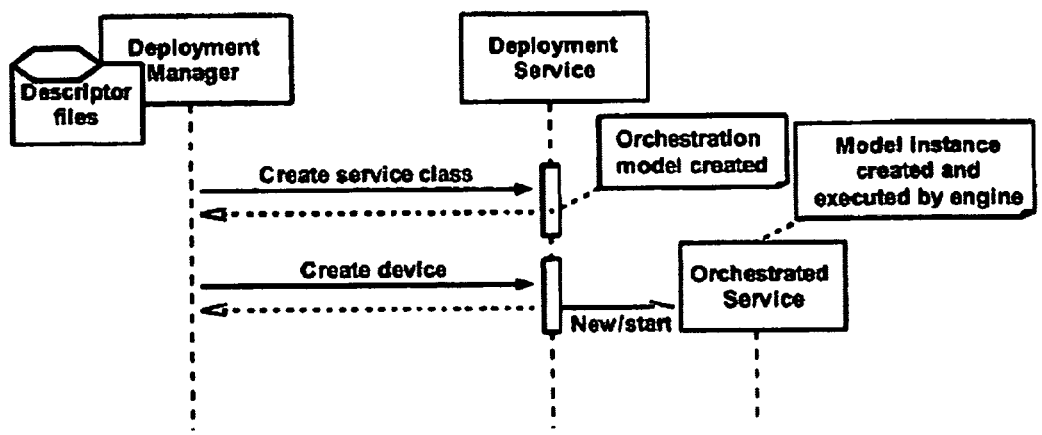
Fig. 29 – Use of the orchestration service as a DPWS device.

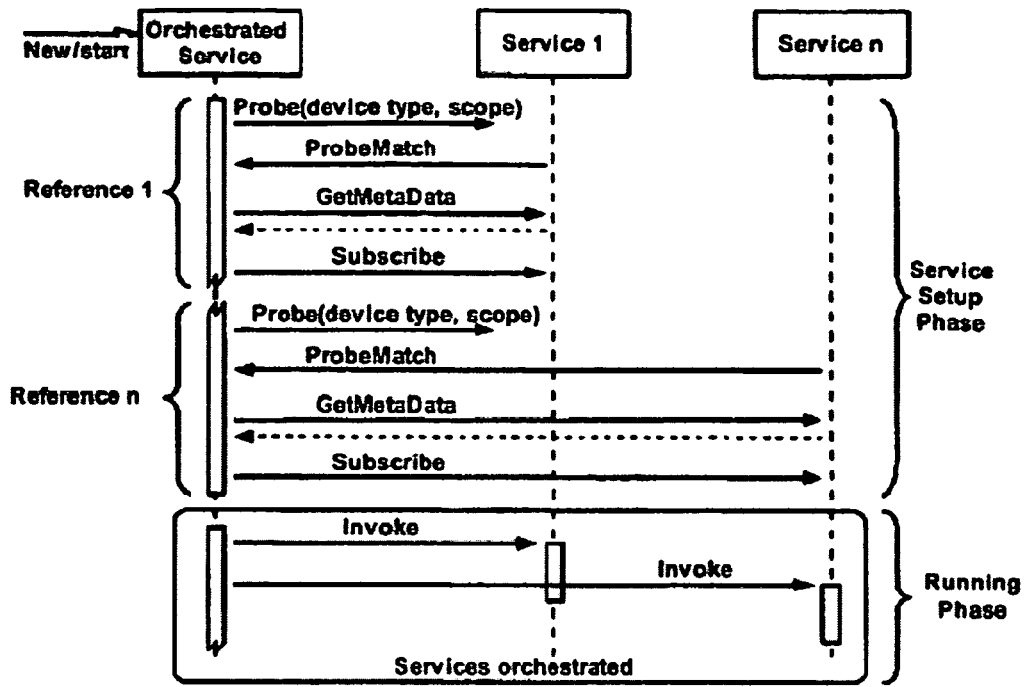
Fig. 30 – Start of execution of the orchestration service.
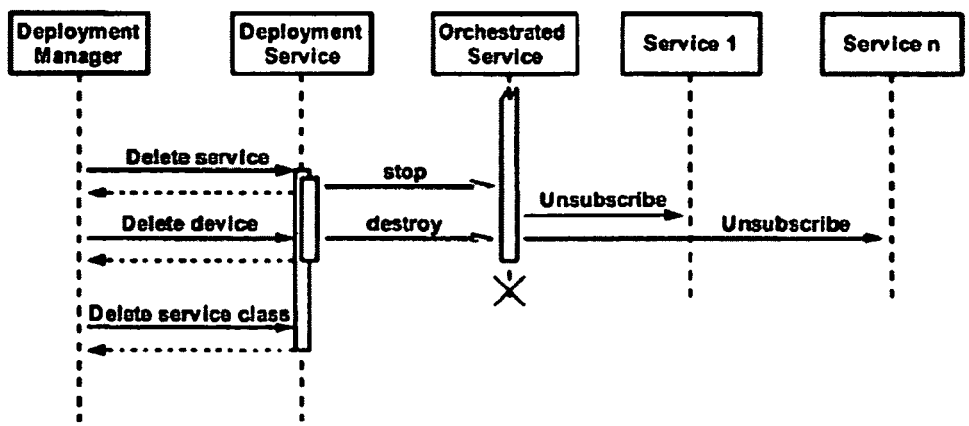
Fig. 31 – Shutdown of the orchestration service.

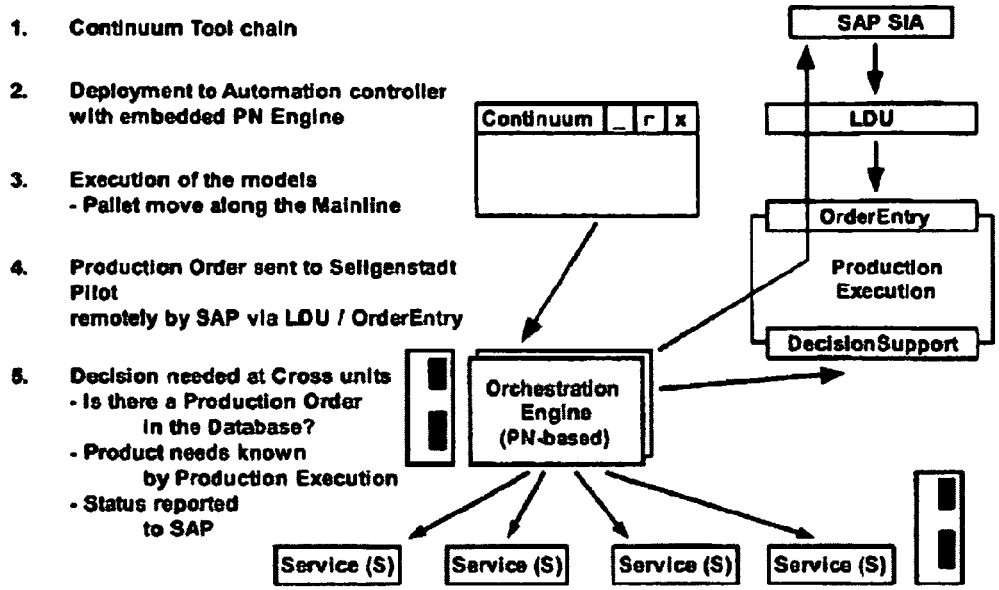
Fig. 32 – Overview of deployment cases.

METHOD FOR CONFIGURATION SOA-BASED AUTOMATION DEVICES AND FOR DEVELOPING AN ORCHESTRATION MACHINE, PRODUCTION METHOD AND PRODUCTION SYSTEM IN SERVICE-ORIENTED ARCHITECTURE HAVING EMBEDDED SERVICE ORCHESTRATION ENGINE

This application is a 371 of PCT/EP2010/063264 filed on Sep. 9, 2010, which claims priority to German patent application number 10 2009 043 968.4, filed Sep. 9, 2009, which is incorporated herein by reference.

The invention relates to a method for configuration of SOA-based automation devices and for developing an orchestration machine, and a production method and production system in service-oriented architecture having an embedded service orchestration engine.

WO-A-2009/053472 describes a method for orchestration of services of a service-oriented automation system as well as an orchestration machine. System components offer their functionalities as services and are capable of querying services of other system components, such that the behavior of the automation system is controlled through orchestration of the services of the system components by means of an orchestration machine. To achieve orchestration of services at the device level, it is provided that the orchestration machine will use high-level Petri Nets tailored to service-oriented systems and that the orchestration of the services on the gate level is accomplished by interpretation and execution of various HLPN models representing the behavior of the automation system and/or the system components.

WO-A-2009/101212 relates to a method and a system for embedding service-oriented automation components of a production shop in a flexible IT enterprise architecture. To configure flexible production shops in the form of an orchestration method and to specify elements, it is provided that the service-oriented automation components are coupled to the higher level via orchestration middleware and the services offered by the service-oriented automation components are integrated into the higher level by using a vectorial function and a layout based on orchestration of service-oriented automation components.

In addition, a service-oriented automation device and method for specifying a service-oriented automation device are described in WO-A-2009/103811. The following process steps are proposed for describing the operating performance of autonomous and collaborative automation devices and production shops with a service-oriented architecture:

Original setup of the automation device including configuration, explanation of services, establishment of links to other automation devices and transfer of the setup to awaiting original status, receipt of the results about service operations, internal device interfaces generated by inputs/outputs and/or directly by the control unit, analyzing the results received, implementing the results and the change in status of the model-based middleware shell, wherein the system reaches the next state and is capable of receiving additional results.

Modern industrial production systems are characterized by distributed systems, operators, products and information. These systems must be suitable for mass production and specific adjustments on a larger scale. A large number of factors are required for effective operation of such flexible production lines, including the number of product options, the production sequence for the respective product, the type of product, the capacity of the workstations, the processing time of the production processes at each workstation, the material processing capacity at each workstation and the total material processing capacity. The data thereby obtained and data to be processed later may therefore be subject to constant changes regardless of the large volume of data.

Components of distributed software are already being used in the form of distributed objects, function blocks and services, the latter in the form of a service-oriented architecture (SOA) and a service-oriented computing (SoC), which is currently growing in popularity in industrial automation systems. The dominant view of the future will be based on the idea of "service-oriented computing" which offers a way to create a new architecture and reflects the trend in components toward autonomy and heterogeneity." Its growing usability in the business world and in e-commerce is seen as a step toward achieving a seamless integration of resources from different levels. Numerous efforts are currently being undertaken to research these fields more thoroughly, e.g., the SOCRADES project (http://www.socrades.eu).

In general, SoA considers the system only from the standpoint of its services, whereas a lower importance is assigned to its providers and users. These entities may be automation devices, software components and the like and have the special ability to encapsulate resources within services. They represent a new approach and are fundamentally different from memory programmable controllers (PLC, programmable logic controllers) in the field of automation.

These entities have occasionally been referred to as intelligent devices, and although they have also been named differently under some circumstances, they are similar in the property of being service-oriented autonomous control units, devices, actuators and sensors. Service computing and service orientation are therefore regarded not only as a form of communication but rather as a philosophy that should be assumed by the software entities by sharing their resources and expressing their requirements. This is the new design approach and style of thinking of automation technicians, enterprise managers and software developers who are tasked with the job of creating important tools and methodologies. Service-oriented automation software entities which are used in approaches of this type require a number of methodologies and software devoted to the specification of computer systems as well as embedded automation devices. These applications also contribute toward a shortening of development times and a reduction in the interdependence of the components, so that adequate flexibility for automatic reconfiguration of production arrangements is achieved.

With regard to the technology, the Device Profile for Web Services (DPWS) has been stipulated as the standard in this project. Since it describes only a few specific protocols, a compatible framework must be used to ensure communication of the software components in a service-oriented manner in the same language. One of the systems implemented is the SOA4D system (Service-Oriented Architecture for Devices) (https://forge.soa4d.org/), which is targeted at larger computer systems (e.g., PCs) and embedded devices.

Against this background, the problem on which the present invention is based is to further develop a method for configuration of SOA-based automation devices and for developing an orchestration machine, such that there will be the possibility of modeling each component of a system individually and equipping them with logic interfaces, and wherein an automated composition of the models of the components to form a static overall model of the system is made possible.

In addition, the object of the invention is to make available a manufacturing method and a manufacturing system based on an implemented orchestration machine that supplies conflict resolution mechanisms.

This object is achieved according to the present invention by a method for configuration of an automation device having an orchestration machine by means of the features of claim 1, among others.

The production system (DAS) comprises:

a plurality of mechatronic components and/or devices (C1-C11, L1, L2, W1, W2, MC), such as transport units, lifters and workstations which work jointly to produce products, a plurality of automation devices (STB) for controlling the mechatronic components and/or devices (C1-C11, L1, L2, W1, W2, MC), wherein a group of mechatronic components and/or devices or a mechanic component and/or device is assigned to each of the automation devices (STB), wherein the automatic devices (STB) are interconnected via a network (N) and are connected to a Production Execution System (PES) for exchanging messages with one another, wherein the automation device (STB) assigned to a mechatronic component and/or device or a group of mechatronic components and/or devices is configured in such a way that the mechatronic component and/or the device or the group of mechatronic components and/or devices can be retrieved in the network (N) as a logic device, and functions of the mechatronic component and/or device or the group of mechatronic components and/or devices can be retrieved as an elementary service (S) in the network (N), wherein the production system (DAS) has at least two implemented Service Orchestration Engines (OE), wherein each Service Orchestration Engine (OE) is configured such that elementary services (S) of a group of mechatronic components and/or devices belonging together from the standpoint of production technology are orchestrated and represented in the network (N) on the basis of interconnected and/or synchronized orchestration and/or behavior models.

The orchestration engine (OE) is preferably linked to a Decision Support System (DSS) via the network (N), this Decision Support System being implemented in the Production Execution System, such that decision support can be queried when conflicts occur at the conflict nodes on execution of the orchestration model and/or behavior model implemented in the orchestration engine (OE).

The model-based service orchestration machine utilizes a Petri Net dialect as the modeling language and logic language: high-level Petri Net (HL-PN). The HL-PN has been expanded by elements to map web service-specific properties directly onto the HL-PN model: service and data contracts as well as configuration of the DPWS discovery. However, the models can also be expanded by additional properties. In addition to DPWS-compatible web services, other message-oriented and event-oriented communication layers can also be configured.

Petri Nets are suitable for mapping of competing and concurrent processes with distributed resources, which operate on a limited set of software and hardware resources. The fundamental approach is to model each component of a system individually and to furnish it with logic interfaces which allow (automated) composition of the model components to form a static overall model of the system. The model instances are interconnected according to the real topology of the system. Due to the fact that the component models supply all the interfaces, the overall model contains all the sequence paths that are possible in principle. On the example of a material flow system, this means that a system consisting of shipping components will contain all flow paths which enable physical conveyance of material by connecting the transport elements. In the trivial case, the system may contain linear paths and thus the process may take place more or less sequentially, but in more complex compositions, the process might contain a few paths with multiple bifurcations and connections, so that alternative sequence paths can be selected in run time. The bifurcations and connections in such complex processes are modeled as conflict nodes in the Petri Net. Conflicts in a Petri Net model may have different meanings in a real system. For example, a pallet on a transport element could be transported in different directions, or two subprocesses may "compete" for the same resource.

A few problems could be solved by simple algorithms, e.g., random selection of a process path, but such approaches are inefficient when seen from a global standpoint or may even be harmful for certain topologies because deadlocks occur there and the process is blocked. It is thus clear that subprocesses should not only be synchronized locally to a limited extent but should also be synchronized in an expanded context. These problems are not new and have already been solved at least in part through Enterprise Resource Planning ERP/Manufacturing Execution System (MES).

For the orchestration machine and an "orchestrated" system of services, an architecture was selected that would permit a separation of the decision algorithms and the service orchestration. There is a special interface between the orchestration machine and the so-called Decision Support System (DSS) for exchanging decision questions, answers and method data for decision-making. At the orchestration level, so-called local decisions are made which are based on simple algorithms and then intervene to resolve conflicts quickly if the higher-level Decision Support System (DSS) has not yet made a decision. At a lower level, decisions are thus made based purely on knowledge of the models and the current status of the models.

From the standpoint of orchestration (bottom-up), the DSS encapsulates the upper systems as a service for decision-making without knowing which algorithms the decision is based on.

From the standpoint of Enterprise Resource Planning (ERP) (top-down), the DSS encapsulates the production system, i.e., manufacturing system, as a Manufacturing Execution System (MES) service with interfaces for receiving production orders and for monitoring production. The ERP system does not have a detailed knowledge of the automation processes but instead only has information about production orders and their status.

Additional details, advantages and features of the invention are derived not only from the claims and the features to be derived from them—individually or in combination—but also from the following description of preferred exemplary embodiments to be derived from the drawings.

Figure 2:
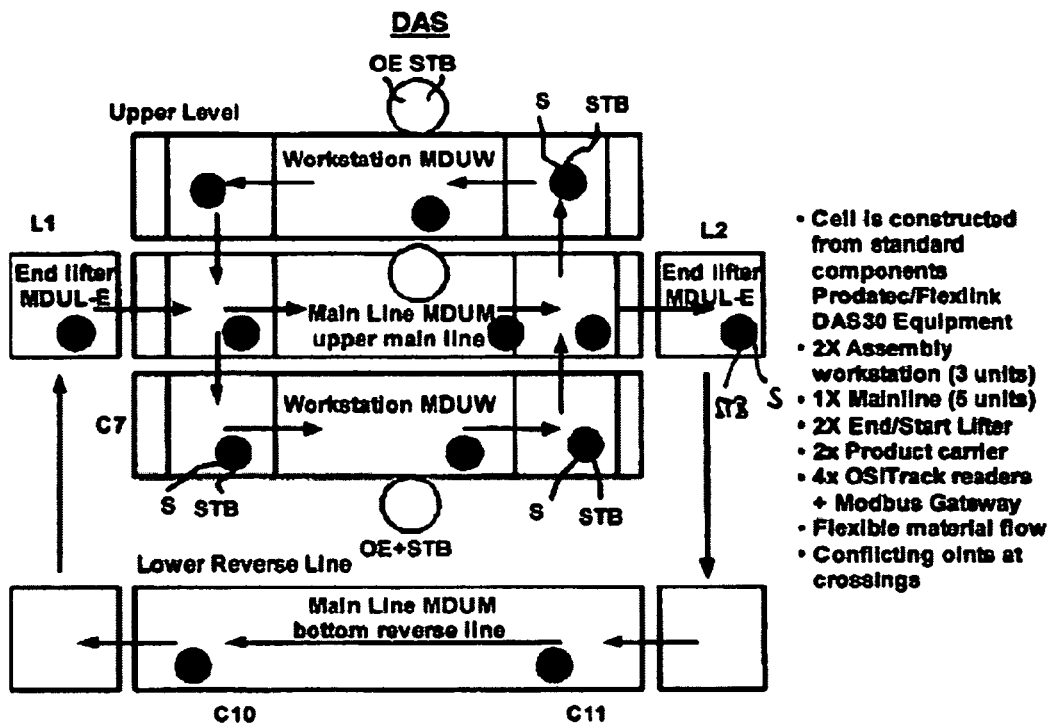
Figure 33:
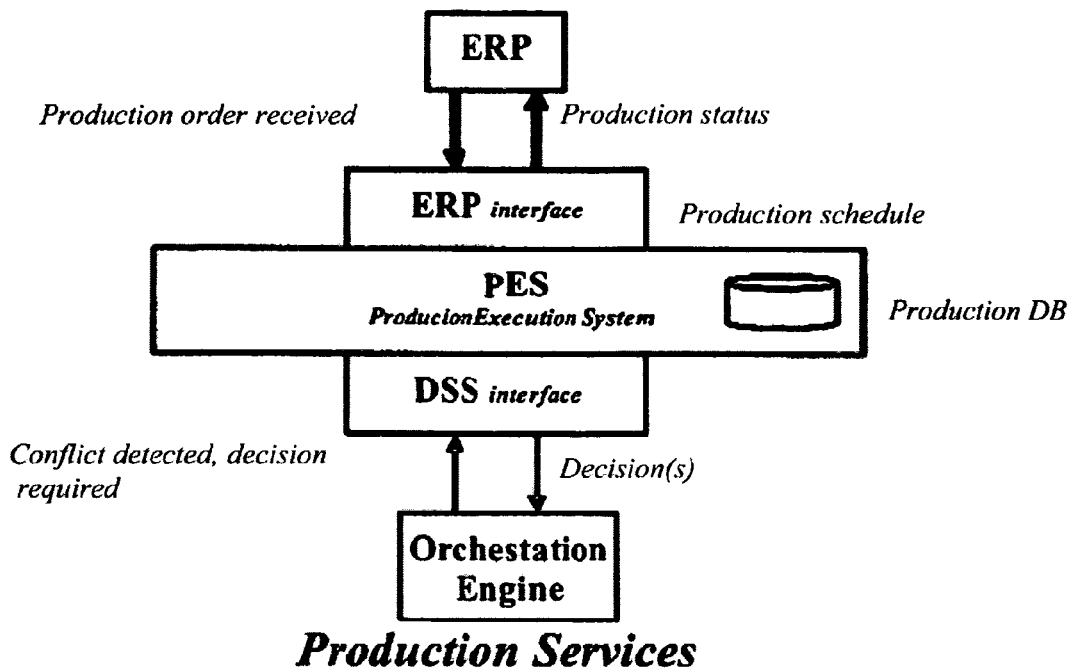
Figure 34:
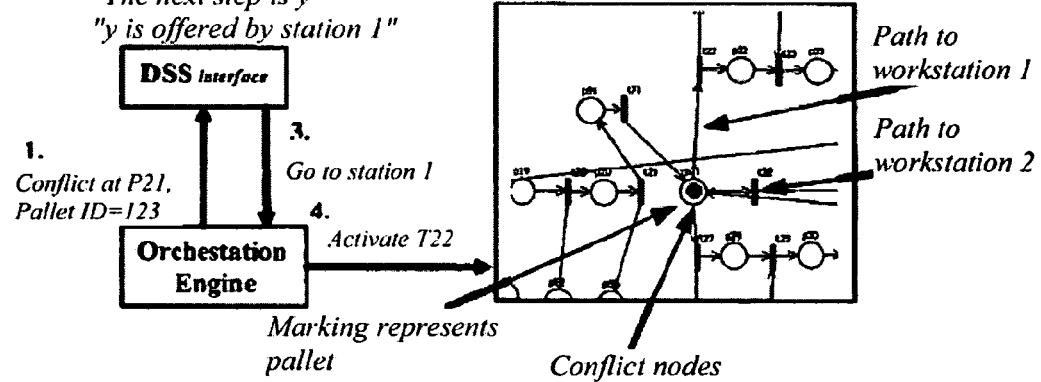
Figure 35:
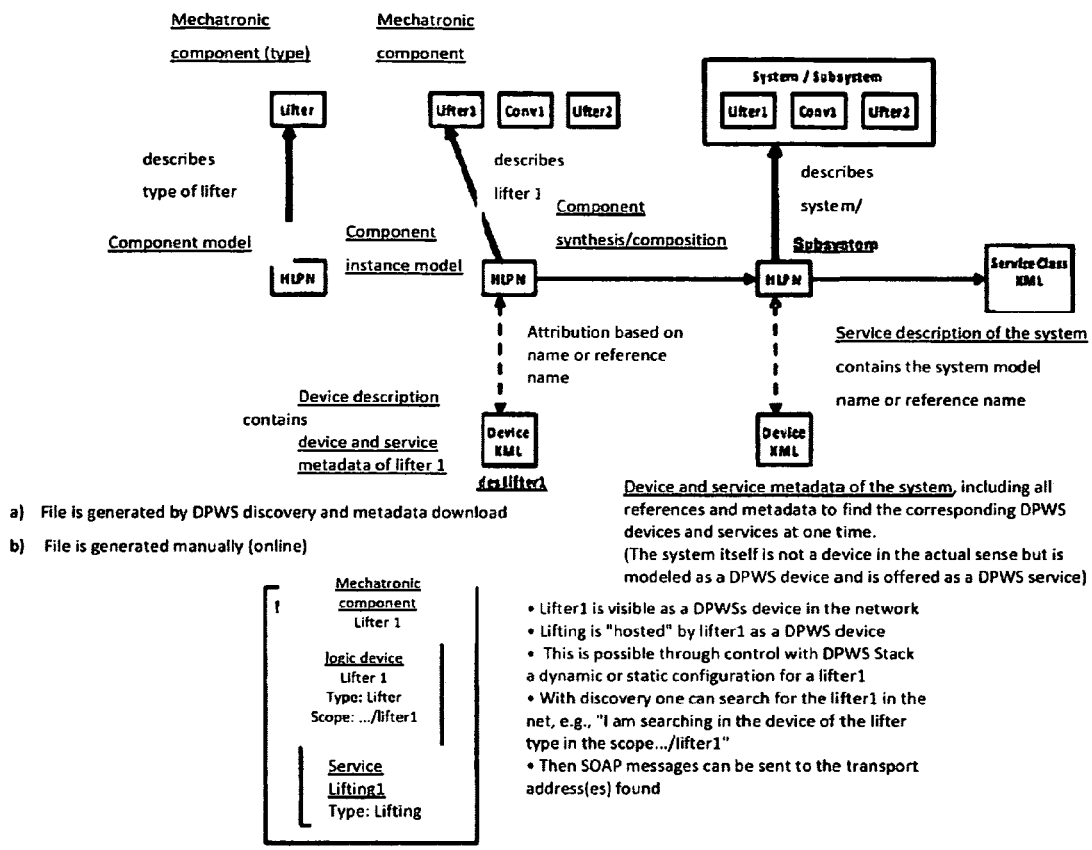

They show:

FIG. 1 hardware of a production system,

FIG. 2 a diagram and a layout of a production system according to FIG. 1,

FIG. 3 a modular design of the production system,

FIG. 4 types of transfer units in the production system,

FIG. 5 schematic diagram of an automation device STB,

FIG. 6 schematic diagram of a collaborative unit,

FIG. 7 schematic diagram of the production system with the connected devices,

FIG. 8 use of automation equipment STB and identification system OSI in the production system, FIG. 9 an approach for service orchestration, FIG. 10 a concept of an automation bot, FIG. 11 main software components of a Continuum Project, FIG. 12 a class diagram and implementations of the Continuum Bot Framework, FIG. 13 a screenshot of a simulated Petri Net in Continuum Development Studio, FIG. 14 schematic diagram of configuration tools and deployment tools for configuration of an automation device, FIG. 15 a communication diagram, FIG. 16 a schematic overview pertaining to a production execution, FIG. 17 a communication diagram pertaining to the creation of a new order and notification of an ERP system during production, FIG. 18 a communication diagram pertaining to notification of the ERP system when a single product is produced, FIG. 19 a communication diagram pertaining to a complete production, FIG. 20 a structure of a database of the Production Execution System PES, FIG. 21 schematic diagram of Petri-Net-based orchestration tools and their engineering, FIG. 22 schematic diagram of engineering steps with the continuum approach, FIG. 23 a message sequence for operating processes of the transfer units, FIG. 24 a message sequence for operating processes of the lifters, FIG. 25 a schematic diagram of a service landscape of the production system, FIG. 26 a schematic diagram of a device connection approach on the basis of the distributed dynamic orchestration approach, FIG. 27 a)-d) orchestration of transfer units and lifters, FIG. 28 schematic diagram of connections of behavior models and generation of orchestration services, FIG. 29 communication scheme pertaining to the deployment of orchestration services as a DPWS device, FIG. 30 communication scheme pertaining to the start of execution of the orchestration services, FIG. 31 communication scheme pertaining to the shutdown of the orchestration services, FIG. 32 schematic diagram of the production system with production execution unit, FIG. 33 schematic diagram of interfaces of the Production Execution System PES, FIG. 34 schematic diagram of a conflict situation at a conflict node and FIG. 35 schematic overview of relationships that are essential to the invention.

A concept of an application scenario is described below.

FIG. 1 shows a manufacturing system DAS (Dynamic Assembly System) to illustrate the application of an SOA approach based on instances of a unidirectional conveyor unit C1-C3, C5, C6-C9, a cross-conveyor unit C4, C6 and a lifter unit L1, L2.

FIG. 2 shows the same system but in a mechatronic model diagram and the connection of automation and/or control units STB with embedded WS-based functionalities, such as elementary services S and orchestrated functions OS as well as placement of orchestration machines, hereinafter referred to as orchestration engines OE. The conveyor system of the Dynamic Assembly System DAS combines flow-oriented production control and modular automation with ergonomic manual assembly approaches for flexibility and versatility.

FIG. 3 shows a modular design of the system with the mechanical conveyor modules C1-C11, lifters L1, L2 and workstations W1, W2.

The central part of the transfer system (units C1-C9) consists of nine transfer units C1-C9 (conveyors, unidirectional and/or cross-conveying) as shown in FIGS. 4 (a) and (b). The unidirectional transfer unit C9 has an input port and an output port PORT1, PORT3; the cross-conveyor unit C4, C6 permits transfer not only in the longitudinal direction but also in the direction perpendicular to that and includes the input and output ports PORT1-PORT4. These units have an optical sensor S1 and an output for a conveyor motor M. Furthermore, a cross-conveyor unit C4, C6 may be regarded as a combination of two devices, namely first a unidirectional transfer unit C2, C5, C8 and a lifter L1, L2 with the possibility of executing directional transfers.

The cross-conveyor units C4, C6 have two optical sensors S1, S2 to detect the presence of a pallet P and two other sensors S3, S4 to detect whether a cross-connection CC is in the upper or lower position. The four outputs are used for control of motors M—one for the normal conveyor motor M1, another motor M2 to lift the central directional cross-connection module and two motors M3, M4, one for the directional transfer clockwise and another for the directional transfer counterclockwise.

The lower transfer units C10, C11 have the same behavior as the normal unidirectional transfer units, e.g., unit C5, but are longer.

Lifters are identified by units L1 and L2, as shown in FIG. 3 and FIG. 4 (c). In addition to their function as an interface between the upper and lower parts of the system, they are also responsible for the transfer of pallets P into and out of a manufacturing cell. One transfer unit TE in the lifter L1, L2 has two optical sensors S1, S2 for detecting the presence of a pallet P. Photoelectric beams are provided at both ends of the units. The transfer unit TE may additionally be moved in two directions (by analogy with the central unit CC of the cross-conveyor unit C4, C6), so there is an output PORT1-PORT4 for each direction. One lifter motor HM is controlled by a Telemecanique (registered trademark) Altivar 71 in combination with a ControllerInside card (frequency convertor for lift control), which counts the instantaneous position of the conveyor and calculates it. The ControllerInside card was selected instead of the Advantys (registered trademark) EHC3020 fast counter module because at the time of selection the required precision for the lift position (<1 mm) was not ensured.

The characteristics of the individual components of the transfer units in the system are summarized in the following table.

| Unit ID | Type and functions | Pallet IN port | Pallet OUT port |
|---|---|---|---|
| C1, C3, C7, C9 | across | 3 available, only one used[1] | 3 available, only one used[1] |
| C2, C8 | unidirectional user panel, workplace, RFID[2] | 1 | 1 |
| C4, C6 | across, RFID[2] | 3 available, only two used[1] | 3 available, only two used[1] |
| C5 | unidirectional | 1 | 1 |
| C10-C11 | unidirectional (long) | 1 | 1 |
| L1, L2 | starting and ending lifter[3] | 2 available, only one used[1] | 2 available, only one used[1] |

[1]Due to the physical combination of units, only some of the input and output ports of the pallets are available (input connected to output) and/or can be activated according to the reasonable principle (dead end).
[2]RFID radio frequency identification.
[3]The starting lifter is prepared for use of RFID.

The pallets P are deployed manually into the system with the help of the units C2 and C8 and are conveyed on alternative paths to the workstations W1 and W2. In this very small cell, a pallet P circulates in the system until it is directed to one of the workstations. The path is determined at the cross units as a function of the production processes required for the product placed on a certain pallet and this depends on the site and on the availability of the production services in the system (at W1 and W2 here). A workstation may offer more than one production mode, and one production mode may be possible from more than one workstation.

As soon as a pallet P is directed to a given workstation W1, W2 to receive a certain production process, the line control system (a service orchestration in the present case) stops the pallet P at the transfer unit C2, C8 until the production process has been triggered by the operator. The signal of the operator is transmitted by a simple HMI (human-machine interface) application.

To identify the pallet P, the cross units C4, C6 and the workstation units C2, C8 are each equipped with an identification unit, i.e., such as an RFID device (radio frequency identification), which has the ability to read data from/write data to labels on the pallets P. The identification unit IE is used by the line orchestration to "question" an external Production Execution System (PES) about the next production step provided. Alternatively, this query may not be made at each cross-connection but instead the production sequence can be stored on the production label and read off from it.

The automation and control sequence is explained below.

Numerous automation devices STB are used for controlling the mechanical parts of the production system and form the interface with a Production Execution System PES of a higher level by offering and utilizing services.

Advantys STB: Each of the system modules and/or the components C1-C11, L1-L2, W1, W2 is controlled individually by an automation device STB such as Telemecanique (registered trademark) Advantys STB NIP2311, which is shown schematically in FIG. 5. The automation device STB has an Ethernet interface module NIM and can be assembled by the user from various input/output modules IO, depending on the process requirements.

Advantys STB+IEC Engine: For implementation of an IEC engine IECE in an automation device STB_IECE; the CPU of the Ethernet module NIM is used as the host for a SOCRADES service infrastructure, which permits the deployment of user-defined applications as DPWS (Device Profile for Web Services)-compatible service components. Digital I/O modules IO and the fast counter module are supported. The Ethernet module NIM permits simple logic modes between I/O points and maps the process to the Modbus registers. FIG. 4 shows an island with digital 6-bit input and output modules. The automation device STB_IECE is used for the implementation of various units as mechatronic components, which means that each unit is controlled by its own automation device STB_IECE, and its functions are offered as a web service. These services are implemented by the automation device STB_IECE with an embedded IEC engine IECE. Software such as ControlBuild from the company Geensys is used to determine the logic and the services offline and then transmit them to the automation devices STB_IECE. Function Block Diagram Language, Ladder Language and Sequential Functional Chart Language are currently supported.

Advantys STB+Petri Net Engine: A further automation device STB_PNE, which offers an embedded Service Orchestration Engine based on a Petri Net Engine PNE has also been implemented like the DPWS stack with the same deployment mechanisms as for the automation device STB_IECE with an IEC engine. With the current type of implementation of the IEC and the Petri Net Engine PNE, the integration into the same physical device is not possible. The number of OS resources (tasks and semaphores) for the two together is too high and requires fundamental optimizations. In addition, the Petri Net Engine PNE cannot yet be combined with the I/O or the reporting subsystem of the IEC engine via interface. Software such as Continuum Development Studio CDS is used for creating system models and for use of these models with the automation device(s) STB.

OSITrack (brand name) RFID: An identification system OSI such as OSITrack (brand name) RFID device is used for the RFID read/write access. The OSITrack devices OSI are connected to a control unit TSX (RS485 to Ethernet converter) by means of Modbus serial, and this control unit communicates with the network N via ModbusTCP. Antennas of the identification system OSI are placed on the modules C2, C4, C6 and C8. Therefore, each pallet P can be identified by a 112-kbyte label on the underside. In the production system, each pallet P has its own label ID. Information about the workflow of a specific pallet P is stored in a database. The identification system OSI automatically checks for the presence of a pallet and transmits the data of its label to the control unit TSX. Each time a new label is detected by the antenna, this data is updated.

The integration of the control devices STB into mechatronic components/modules of the electromechanical modular system yields a "collaborative automation unit" as diagrammed schematically in FIG. 6.

The following connection between individual devices is used (see FIG. 7):

| Unit ID/Device | Devices | Firmware/Tools |
|---|---|---|
| C1-C3, C7-C9 (line of workstations) | 2 + 1 STB | ControlBuild[1] |
| C4-C6 (mainline) | 3 STBs | ControlBuild[1] |
| C10, C11 (return line) | 1 STB | ControlBuild[1] |
| L1, L2 (lifter) | 1 + 1 STB | ControlBuild[1] |
| RFID antennas for C2, C4, C6 and C8 | TSX ETG 100 | DPWS-to-ModbusTCP Gateway[2] |
| Combined services 1, 2 and 3 | 3 STBs | Petri Net Engine, Continuum Development Tools[3] |

[1]ControlBuild is used for offline description of the logic and the service and is then used on the STBs.
[2]PC-based DPWS-to-ModbusTCP Gateway is software with which some logic units and services can be fixedly programmed (e.g., for RFID).
[3]Individual STBs with embedded Petri Net Engine are configured by means of Continuum Development Tools.

FIG. 8 shows the placement of the WS-compatible control devices STB_PNE, STB_IECE.

Each workstation W1, W2 is equipped with a user panel having two buttons and one switch. The user panel is not used in the production system shown here; its actual use was to activate and deactivate the workstation W1, W2 plus the possibility of the user sending two commands, e.g., OK and ERROR. This functionality is enabled by a PC-based HMI, which displays the product data and gives the user an opportunity to enter the results of the procedure. Without these buttons, the workplace has the same properties as a simple unidirectional transfer unit.

The approach for creating complex flexible and reconfigurable production systems is that these systems are composed of reusable modular components, which offer their production properties as a number of different services. This approach to assembly is valid for most levels in production. Simple devices are assembled to form complex devices or machines, which are themselves reconstructed to create cells or lines of a production system. The same thing is also true of designing service-oriented production systems and assembling complex services from simpler services.

The model-based orchestration engine OE together with the orchestration tools CDS is part of a system architecture, which is referred to in FIG. 9 as a general orchestration engine box. This figure also gives an overview of the relationships with other integrated components, e.g., the Decision Support System DSS and the design and simulation of service-oriented systems with 2D/3D engineering environments CDS.

Based on hardware and overall project requirements, it has been decided that the fundamental building blocks which constitute the distributed system should be configurable software components for different tasks. Software components have therefore been drafted as bots that have a so-called "orchestration engine" internally and are capable of coordinating their activities (in a service-oriented manner) and also taking over collaboration processes with other components in the system.

In the example according to FIG. 10, the autonomy range of the bot is a transfer unit (conveyor). The communication with other software components in the system (e.g., other bots) is implemented via the offer of services and utilization of the required services of other components. For the design, configuration and maintenance of the bots, various tools are required and must be user friendly and must accelerate development by using a program approach at a higher level (visual languages).

Since services are not isolated entities using directly linked software components, a logic unit which creates the interaction is to be provided. The selected modeling language is obtained from Petri Net specifications with expansions at a higher level, such as time considerations, a property system and an adaptable token engine. This is referred to below as a Petri Net of a higher level (high-level Petri Net, HLPN). The expandable property mechanism of the HLPN is used as an interface for configuration of the properties associated with the web service.

Additional requirements include the use of the Decision Support System (DSS), which is capable of making correct data available to the Petri Net model at each decision point. This DSS is the most important interface between the model-based approach for the transport system and the production planning system.

Additional details about the scientific approaches used are disclosed in the following publications (all of which refer to the SOCRADES project). The full content of these publications is herewith referenced:

J. Marco Mendes, Paulo Leitão, Armando W. Colombo, Francisco Restivo, "Service-oriented control architecture for reconfigurable production systems", Veröffentlichung zur 6. Internationalen Konferenz des IEEE über Industrie-Informatik, pp. 744-749, 2008.

J. M. Mendes, J. de Sousa, P. Leitao, A. W. Colombo, F. Restivo, "Event Router-Scheduler for the Modular Anatomy of Service-oriented Automation Components", Veröffentlichung zur 6. Internationalen Konferenz des CIRP zur Intelligenten Systemen im Bereich Manufacturing Engineering, pp. 585-590, 2008.

J. Marco Mendes, Alexandre Rodrigues, Paulo Leitão, Armando W. Colombo, Francisco Restivo, "Distributed Control Patterns using Device Profile for Web Services", Veröffentlichung zum 12. Workshop der Internationalen Konferenz der IEEE EDOC, 2008.

Paulo Leitão, J. Marco Mendes, Armando W. Colombo, "Decision Support System in a Service-oriented Control Architecture for Industrial Automation", Veröffentlichung zur 13. Internationalen Konferenz des IEEE üer sich abzeichnende Technologien und Fabrik-Automation, pp. 1228-1235, 2008.

J. Marco Mendes, Paulo Leitão, Armando W. Colombo, Francisco Restivo, "High-Level Petri Nets Control Modules for Service-Oriented Devices: A Case Study", Veröffentlichung zur 34. jährlichen Konferenz der IEEE Industrial Electronics Society, pp. 1487-1492, 2008.

João Pinto, J. Marco Mendes, Paulo Leitao, Armando W. Colombo, Axel Bepperling, Francisco Restivo, "Decision Support System for Petri Nets Enabled Automation Components", Veröffentlichung zur 7. IEEE Internationale Konferenz über Industrie-Informatik, 2009.

J. Marco Mendes, Axel Bepperling, João Pinto, Paulo Leitão, Francisco Restivo, Armando W. Colombo, "Software Methodologies for the Engineering of Service-Oriented Industrial Automation: The Continuum Project", Veröffentlichung zur 33. jährlichen Internationale IEEE-Konferenz über Computersoftware und Applikationen, 2009.

J. Marco Mendes, Francisco Restivo, Paulo Leitão, Armando W. Colombo, "Customizable Service-oriented Petri Net Controllers", Angenommen zur 35. jährlichen Konferenz des IEEE-Industrie-Elektronikgesellschaft, 2009.

Since SOA-based automation systems do not have the respective user software and methodologies, efforts have been undertaken in the field of software development and several software packages have been created for the production system being used. In each case, system engineering and the associated tools should facilitate the work of the developer. With regard to the Petri Net, there is only limited practical benefit due to the lack of computer tools which would enable simple utilization of large and complex networks.

This project has been referred to as Continuum Development Tools in accordance with the continuum concept known from physics and philosophy. The first developments were achieved by integration of software components that had already been developed, in particular the PndK (Petri Nets Development ToolKit) under the same name. With this integration, the demand for numerous software packages became obvious, including: a framework for development of bots, engineering tools for creating and managing bots and numerous additional aids (mainly libraries) to support tasks such as communication and interfaces for devices.

FIG. 11 shows a component diagram with numerous grouped software components, which were planned for the original extent of the Continuum Project. Target systems range from traditional PCs (specifically for engineering tools) to devices which must embed the generated bot code. The groups are categorized according to automation bots, the engineering tools which they support and additional aids (in the form of libraries) for development support. The main component would be the Continuum Bot Framework (CBF) for development of the bots and their functional modules, which find their development approach in the anatomy of living creatures. Another component, Continuum Development Studio (CDS), which is based on an expandable document/view framework, offers an engineering tool for scientifically oriented bots, for example, the support of visual description, analysis and behavior simulation (currently in Petri Net formalism according to the definition of T. Murata, 1989). Automation bots and engineering tools are both described in detail in the next sections.

The support package includes several reusable software libraries and tools. Some of these were developed internally and others were added from external sources, e.g., the SAO-4D-DPWS library (available at https://forge.soa4d.org) for the development of web services and the QT Toolkit (see http://qtsoftware.com) which is used mainly as a graphic toolkit for human interaction in CDS.

The main development languages are C and C++. The development environment was generated and managed with the help of multiple tools; the versioning system used was Subversion (http://subversion.tigris.org). CMake (http://www.cmake.org) was selected as the building system (allows development and generation beyond a given platform). In addition, the documentation is generated with the aid of Doxygen (http://www.doxygen.org/). No special software project management tool is used because the group consists of only a few people, and development can normally be conducted at one location.

To meet the necessary requirements, bots intended for implementation of multiple functions must have a consistent anatomy for the functionality of the various function modules ("organs"). Modules running asynchronously, possible data inconsistencies and processes and threads running in parallel may cause problems. In general, module integration into a completely functioning bot may be considered. By analogy with what takes place in almost all creatures having a nervous system, the "pulses" or signals generated by the modules must be directed correctly to the destination and interpreted. This may be considered a loose form of integration in event-based integration in particular, in which modules interact with one another by reporting on events and reacting to events.

The Continuum Bot Framework is the basis for the development of bots. FIG. 12 shows a class diagram, focusing on the CBF and implementations of the modules and bots. A module may be defined by inheritance of the CBF Abstract Module Class and specific functionalities may thereby be added to it. For example, the Petri Net Kernel Module uses the functions and structures of the Continuum Petri Nets Kernel Library. For the DPWS module, the external SOA4D-DPWS library was used to generate a communication module. This can be used by bots for communicating with other bots by offering their own services or by using the services of the others. An independent Bot (integrated as a stand-alone application or as a library) can be achieved by modification of the CBF AbstractBot by adding a special code and combining the modules required. FIG. 12 shows an example of a mechatronic bot which depends on several modules.

Signals are used for the intraspecific communication of a bot, i.e., there is an event-based interaction between the modules. A signal is generated by the CBF signal class and several parameters and user data can be defined with the instances of the signal. Signals are sent by a module and relayed over an intermediate CBF module manager, which is connected to each module. Reception and analysis of the signals are performed by each module asynchronously. When a signal is received, it is stored in the local queue of the module. Internally a module represents a thread loop which analyzes the local queue of received signals. When a signal is taken from the queue, this triggers the execution of a program code corresponding to this event. The signal mechanism used may be compared with the signal/slot principle of the QT Toolkit with regard to function.

However, it may also be appropriate to use Petri Nets for typical systems with a defined behavior or also for more complex systems with distributed participants. In any case, system engineering and the respective tools should facilitate the work of the developer. With regard to the Petri Net, it has only limited practical benefit due to the lack of computer tools which would enable simple utilization of large and complex networks. Continuum Development Studio (CDS) therefore intends to offer a user-friendly environment for multiple engineering tasks of service-oriented automation systems, from specification and configuration of the automation bot, analysis and simulation, to starting operation of the system. FIG. 13 shows a screenshot of CDS simulating a Petri Net test model.

This development has been based on a port and the natural further development of the previous PndK, which was provided additionally with a Multi-Document/View-type framework (like the structural template of the Model View Controller) plus additional tools. The framework was created on the inadequate basis of the QT Toolkit that was used (which actually supports Model View programming in class form but does not have a framework for its administration and integration into an application). Essentially, the framework has a document manager class for monitoring documents and their views, a Project Explorer for adding documents in a logical manner and the abstract classes, with which developers can furnish personalized documents and views. The document manager allows the creation of document instances and view instances in the manner of the factory method and also offers personalization of their tools, e.g., toolbars and other widgets. File management (through operations such as New, Open, Save, etc.) is also handled in an integrated manner for all types of documents. At the present time, only Petri Net types and text document types (and corresponding views) are implemented.

Petri Net Document/View allows design, analysis and independent simulation of Petri Nets. In addition, a personalized property system has been developed, which provides for the addition of Petri Nets and their elements with information which can be used so that a Petri Net model can be associated with the behavior of an automation bot, for example. It is also possible to import a WSDL data file that has already been configured and assign it to the transitions of the modeled Petri Net, so that the transitions actively participate in the message sequences when the model is used in a bot. There is a built-in orchestration engine which can coordinate and synchronize the services in accordance with the Petri-Net-defined workflow (using the SOA4D-DPWS library). Configuration of the bots (with the Petri Net Kernel Module) is performed mainly by describing the expected behavior based on a Petri Net model, including the utilization of external services, providing one's own services and by device access.

The previous sections have explained how a Petri Net designer can specify models for mechatronic components or even larger systems.

According to a first idea of the invention, the invention is based on a method and a software product for configuring HLPNs in SOA-based automation devices.

The next section will describe and explain a tool chain for compiling systems SYS, the creation of configuration files DF (descriptor files) and the use of these files on devices STB or on simulators SIM. FIG. 14 shows the complete sequence of component design or system design as well as the compilation and use of the devices STB.

As already explained above, a system SYS may comprise a plurality of mechatronic components C1-C11, L1, L2, W1, W2, which are embodied as a unit of mechanics, electronics, controllers and an interface such as, for example, communication by means of web services. Examples of mechatronic components include the lifters L1, L2 and the transfer units C1-C11, each with the respective automation device STB.

Taking into account WSDL files and device templates DT, so-called Component Instance Models CIM, which have an instance name and reference name, are formed from the component models. The Component Instance Model CIM describes a certain mechatronic component such as lifters L1, L2 in the system SYS, for example, the lifter L1 of a local system.

A component model is understood to be an HLPN model of a mechatronic component without instance names or reference names. A component model CM describes all the components of one type, for example, lifters L1, L2.

Other extremely important tools include:

Composition Tool CT—Using this tool, component models CIM are assembled according to a Layout Configuration File LCT, which connects logic ports PORT1, PORT2, PORT3, PORT4 of Component Instance Models to one another.

Configuration Generator CG—This creates deployment files and/or configuration files DF from Petri Net system models SM, references, WSDLs and Device Descriptor Files.

Deployment Manager WSM—This loads the deployment files and/or configuration files DF thereby generated into the target device STB by means of a WS management deployment service. The target device STB must host a Petri Net orchestration engine OE and must be identified by its UUID.

Additional tools:

WSDL Parser—This allows the user to test the reporting structures of a WSDL file in detail. This is necessary when WSDL processes are mapped in transitions and additional reporting parameters are added to the transition properties.

Template Generator of Device Descriptor Files—This creates a new Device Descriptor File from given reference names. The reference name is used to generate the device model data, the device types and the device application range.

Device Search tool—This is a support tool which detects all the DPWS devices in the network and writes Device Descriptor Files locally, so that they can be used later by the designer and the Configuration Generator Tool CG. These files should be renamed because they show the descriptor names and the UUID of the device.

Apache HTTP server—This should be used for storage of WSDL files and scheme files.

Materna Service Explorer—This is a support tool for support during the testing phase.

Prerequisite:

Correct configuration by designer: tool paths set; local directory of the WSDL set; WSDL basic URL set.

Device Descriptor Files available: For all components that are physically present (one should use Device Search tool); for all newly added components (use the Template Generator tool).

HTTP server: running; all WSDL and scheme files are stored at the correct storage site.

Preparations in detail:

The Composition Tool CT is used for semiautomatic composition of a system model SM from a set of Component Instance Models CIM. The composition runs according to a Layout Configuration File LCF (XML-based XRC files) which describes the relationships of the Component Instance Models CIM to be connected. The file is generated with the help of a text editor or by means of external tools, e.g., Delmia. In addition, the user must generate a single-model CIM for each physical component C1-C11, L1, L2 (copy and insert) even if the same models CIM are used. Each Component Instance Model CIM must then be configured with a correct and binding reference name. This must be performed by the designer or by replacing character strings in the text editor.

Device Descriptor Files DDF are needed for creating the configuration files CF; these Device Descriptor Files establish a 1:1 link between the binding reference name in the models CIM and the real DPWS devices/services. The user can start a network scan procedure for detecting all DPWS devices which write Device Descriptor Files, including the device type, operational use, address, descriptor name, etc. The user next generates the connection to the binding name by renaming the respective Device Descriptor File.

A DPWS device is understood to be a logic device (visible as a service endpoint in the network) which offers certain services for discovery and metadata access. A DPWS device is a container for the actual functional services (DPWS services).

DPWS is a standard which defines a separate resource model with DPWS devices and services. The DPWS standard requires that a DPWS device must be available as the service endpoint in the network and must offer WS Discovery and WS Metadata Exchange as services. DPWS services may thus be queried and addressed by the device. For example, the lifter L1 is a DPWS device of the lifter type which offers the DPWS services such as "lifting" and "transfer."

A DPWS service is a DPWS-compatible dedicated service of the "lifting" or "transfer" type, for example. Furthermore, WS metadata exchange and optionally also WS eventing are required and supported by the DPWS standard.

Metadata of a service that is used refers to additional information of a service (endpoints) which can be downloaded by the device via DPWS services.

A system model SM that should be used is represented as a DPWS device. Therefore a Device Descriptor File is also needed for this purpose. The creation of a new descriptor file is generated by the template generator batch file which therefore needs a binding name as input. The binding name must correspond to the project name of the model (name of the XPN file).

An HTTP web server is used to allow access all files via the URL, so that each tool of each computer that can read the metadata of the services used can also interpret the WSDL memory site properties and can thus download the WSDL without user intervention. Materna Explorer can automatically download and generate clients, for example. Another advantage is that these files can be administered centrally in this way.

The current implementation of the general communication module, which is configured by rewritten WSDL files, causes certain restrictions on the WSDL files. Only DPWS-compatible definitions can be used, which means that only operations with a SOAP-HTTP connection and document style and literal encoding may be used. Messages may either be blank or may include only a message part. The message part must be based on an XML element and must not be based on a type. The types are to be specified in the same WSDL file. Xsd:sequence may be used, but all specifications for events must be of a fixed size; "unbounded" must not be used. Xsd:choice, Xsd:union, xsd:any must not be used. All basic types are handled as strings and no type testing is performed. Restrictions and facets such as enumerations (Xsd:enumeration) may be used, but here again, there is no type testing. SOAP coding and array types are not supported.

The following steps are to be performed individually, and you must be sure that all preparations have been made (FIG. 15):

Design of component models CM, one per device type and/or component type such as lifters L1, L2, transfer unit C1-C9

The Component Instance Model CIM is created by copying the component model CM and adapting the reference name ("bref" property) according to the Device Descriptor File name associated with the device instance Creating the Layout Configuration Files LCF in the text editor Composition of the Component Instance Models CIM to form one or more system models SM Opening the assembled system models SM in Designer. Alternatively, the system model SM may be opened in a text editor and coordinates of the PN element are set at fixed values.

Generating configuration files DF. This process normally generates two files: a Service Class Descriptor SCD with the referenced port types and a model representation as well as data on the hosted service information with all the discovery hints needed later for the execution engine to solve the referenced component services. Missing WSDL or Device Descriptor Files are displayed for the user.

Being sure that an automation device STB_PNE or a simulator that hosts a Petri Net Engine (PNE, OE) is running and ready to receive the configuration. Identification of the device UUID of the logic device, which hosts the execution service (one should use, for example, Materna (brand name) Explorer).

Retrieving the Execution Manager to load the descriptor file for a specific system model SM onto a target device STB_PNE (UUID for identification of the destination). Repeating this step until all models have been used.

As soon as the destination STB_PNE has received the configuration data, the execution starts automatically.

The goal of the method described here is to show the gain in flexibility by using a service-oriented architecture by executing a production order of an ERP (Enterprise Resource Planning) system ERP directly in the production shop PS, as shown in FIG. 16. In addition, there are only minimal prerequisites of the specific composition of the production line throughout the entire system. However, to be able to offer a coherent application, a specific setup is selected. The detailed production steps are saved in a Production Execution System PES.

This Production Execution System PES is integrated between the Petri-Net-based Decision Support module DSS, which is connected to the intelligent devices STB, and the ERP system ERP (Enterprise Resource Planning), as shown in FIGS. 16 and 17. It registers the New Order Entry in the ERP by means of the Local Discover Unit LDU. When a New Order Entry is received, additional details are queried by the ERP system. To this end, a Get Order Details message is used, identifying the Production Execution System PES itself with a machine ID representing the production unit.

The Production Execution System PES sends the status message READY with the number of producible units back to the system ERP. This response is based on internally stored data with regard to the production time required for an individual product. Production starts after receipt of the Start message. The production execution [command] is sent to the system ERP after each change in order status until the request has been completely executed.

FIG. 18 shows the necessary interaction before a status update can be performed. The production queue is initially empty. Starting production with the help of the Start message activates the production process. Then the next service inquiry for an empty pallet generates a new product entry. The service queried for the first production step is sent back to the Petri Net Engine requesting the next service. Then the pallet is moved to the production unit where the production step is performed. After conclusion of this step, the termination of the service is signaled to the Production Execution System.

A production step is terminated after a Service Completed message has been sent from the Production Execution System. This leads to the next step of the service. When the last step of the production list has been executed, the product is completed. Completion of a single product increases the number of products produced by one and triggers a status update, which is sent to the ERP system.

A more extensive sequence for production of a single product is shown in FIG. 19, which follows. This example relates to a product for which the process description is as follows:

1. A new pallet is deployed into the production workflow at the workstation W1.
2. The individual production step is executed at the workstation W2.
3. Finally, the product is terminated again at workstation W1.

The workflow begins within the Petri Net Engine STB_PNE, which requests the decision to continue with production. To identify the pallet Pzu that is to be processed, the engine OE accesses the RFID number of the connected RFID reader OSI and thereby uses the respective service. This connection is modeled according to a specific physical topology in the Petri Net.

This pallet ID is used to obtain the next service from the Production Execution System PES. Due to the service sent back, the Petri Net Engine STB_PNE can continue. Next the pallet P is moved to the intended site, e.g., to the workstation W2. On reaching the destination of the pallet, the production unit W2, which has been guided there, receives the Execute Service command for the given pallet ID. Next the production unit W2 performs the service.

For this application, a PC-based HMI is used as the production unit. This is a program which displays a text message with the production step queried for the user. The text displayed is supplied by the production execution. In a real system, the Production Execution System may supply additional information for performing production steps, e.g., a program for operating a manipulator or the like.

The production unit used is confirmed by the operator after the production step has been terminated by pushing a button. This button may either be part of the HMI or may then be a physical button. In FIG. 3 the Production Execution System is notified that the service "ws1" for the pallet ID=10721 is concluded. With this message, the result of the production step can also be supplied, for example, if the service has been performed successfully, the result="OK" is used. The next time a service is requested for this pallet ID, another service is sent back. Thus the pallet is conveyed to the next service. The times for completion of each individual production step and for producing the overall product are measured and stored in a database.

To demonstrate the workflow over a longer period of time, the production unit may be configured so that it runs automatically. In this case, the service is concluded after a certain period of time. It is thus also possible for the system to produce units and execute orders automatically without human intervention.

To simulate additional scenarios, production steps may be provided with other results than OK, e.g., FAILURE, PROCESSING, DEFECT, NOTONSTOCK.

The Production Execution System stores the data in a corresponding database (FIG. 19). The data may be divided into two parts. The first part is the definition of the production process used in the application. It can define the production steps required for a given URI, for example. The second part serves to receive and execute the individual orders. Time-relevant data is also stored in this part.

The Process Description tables with the Production Step/Production Step List and Provider/Provider List constitute the first part. The production order and product tables are used for the second part.

Various operating modes can be used in the ERP system with the order details. The following table shows the processes that can be used initially with the production steps executed.

| No. | Name | URI | Production steps |
| --- | --- | --- | --- |
| 1 | out | is given | "come to a stop" (ws1) |
| 2 | one-step operation | is given | "deploy pallet" (ws1), "execute production" (ws2), "come to a stop" (ws1) |
| 3 | three-step operation | is given | "deploy pallet" (ws1), "connect housing and electronic parts" (ws2), "attach antenna and close the housing" (ws1), "perform quality check" (ws2), "come to a stop" (ws1) |

The tools used and the engineering methodology were added to the production system with the goal of transporting pallets to the workstations and creating flexibility in the design and maintenance of the system.

As soon as the software is completely concluded and ready for operation, the question arises as to how it is used for specification of the automation system. The numerous engineering steps required from system design to operation and reconfiguration are described in the following section (see FIG. 21).

The design phase currently allows the use of virtual display in a 3D simulation tool, mainly to export the connection data in XML format for the Continuum Development System CDS. The CDS is used for the design and analysis of the Petri Net model for describing the behavior of the bot (FIG. 22.a). If the device/connection information is imported by the 3D simulation tool, then several steps are performed by the CDS: 1) creating instance models CIM of the Petri Net model SM for each bot based on the models generated, 2) creating the required properties of the Petri Net model SM, so that multiple parameters of the given information are written by a 3D simulation tool into the model (e.g., bot/device data, connections, . . . ) and 3) based on the "expansion" of the Petri Net model, the model composition may be used to create a connection logic and for the overall system analysis (FIG. 22.b).

After analysis and simulation (can be performed with the CDS and also with the 3D simulation tool, which supply the services of virtual devices), the bots must then be configured. The process of deployment a service which encapsulates its logic as a Petri Net model to form a bot having an embedded Petri Net Kernel Template model is shown in FIG. 22.c. The deployment functionality is a standard feature of the DPWS and is offered as a dynamic deployment service. The goal and the deployment service can be found through a Stacks Built-In Discovery Service. After the deployment, a new service endpoint is added and the execution of the service logic is initiated. The deployment data comprises data on the Petri Net behavior model, connections to neighbors (required services), services offered by the bot and also additional configuration data for the additional modules of the bot. The bot will self-configure (and will configure its modules) and is then ready for operation.

Operation here means autonomous behavior of the bots according to their defined model plus internal handling of exceptions and the offer and utilization of services by different bots and other software components belonging to the system (FIG. 22.d). Features for higher levels in the service approach also include combining multiple services into one (simplification of the external view), lateral collaboration between bots (offering services), decentralization in comparison with a hierarchical control approach. Business integration (and in general, integration of higher levels) of the production cell is achieved through service orientation. Business requirements are expressed through the production planning and the management of the production cells by monitoring their work status (by means of specific series), deactivation/activation of various routing paths of the production, etc.

During operation, a new configuration may be necessary if a control model for a bot is no longer valid or if production strategies have been changed. In these cases, the bots affected must be stopped (without bringing the system to a standstill), and then the services would no longer be available. During this period of time, new models can be created to achieve a new desired behavior. These models are then transferred to the bots and operation can ultimately be resumed.

This section describes the automation bots (with an embedded orchestration engine) which are used in control devices STB for coordination of the production activities of the scenario. Depending on the distribution of the automation devices during use, each device should have an embedded automation bot that is responsible for its activity. As an example and in view of FIG. 3, one bot may be responsible for all lifter units, while another bot may be responsible for the central part of the conveyor system. A modular system (but necessarily with more devices and therefore more bots) would be the definition of one bot for each of the 12 units and the two workstations.

A bot consists of three main modules:
DPWS communication module COMM,
Petri Net Kernel Module PNKM,
Decision Support Module DSM,
implemented conceptually by means of the framework. The final automation bot has combined functionalities which impart three modules to it, i.e., the bot is a service-oriented Petri Net combination module with internal decision support. Its logic unit is managed by the Petri Net Kernel Module. It interprets a given Petri Net model. Whenever stipulated according to the model, the service operating processes are retrieved and wait on being retrieved by the DPWS communication module. Conflicts and other situations are forwarded to the Decision Support Module.

The properties of the automation bot specified for the method described here can be summarized in the following bullet points:
- Configurable software components with the dynamic deployment functions of the DPWS. This executes not only the configuration of the automation bot but also that of the three internal modules. For example, the Petri Net kernel module would receive the XML representation of a Petri Net.
- Definition of the current service according to deployment data.
- The automation bot can be found and existing services can be utilized.
- The automation bot may also query the services, if necessary (e.g., the current status of the internal Petri Net model is a query for a service of another system component).

The automation bot can be reset on occurrence of an exception (e.g., one pallet was placed at another location).

Interpretation of the Petri Net model and coordination of the services available on the device.

Lateral collaboration with other bots by means of service orientation.

Conflict detection and solving through various mechanisms: transition priorities and responses of the local decision support module. A third trivial solution method may be to simply wait for an external event with regard to the transitions. However, then this is not treated as a conflict by the kernel.

Access to external decision systems for production planning data (e.g., to obtain the next production step for a pallet) and/or by means of RFID readers.

Ability to allow independent software for PCs to run and to also be integrated into automation devices when using minor changes.

Additional information about these components and modules can be found in the research reports.

The goals of application for all physical systems explained in the preceding section and for the software tools and components are as follows:

to test the concept of service orientation and the module-/component-based approaches for the scenario;

to convey the pallets to the correct workstation with a certain degree of flexibility (depending on the production plan);

to use higher-level programming (e.g., Petri-Net-based structures) for combining various elementary services offered by a system;

to respond to events that may occur in industrial production systems;

to define multiple engineering steps for the design, analysis, operation and maintenance of the scenario;

to develop additional software to simplify the engineering processes of such systems.

The following subpoints describe the application procedures step by step.

According to another idea of the invention, the invention is based on an HL-PN-based approach and tools for development and application of orchestration engines embedded in automation systems.

Physical devices such as conveyors C1-C11 and lifters L1, L2 are presented to the network N as logic devices LD. These logic devices LD and their services S run on the STB controllers (even running on a few of them when defined at the PC gateway, e.g., RFIDs). The specification of the services S of the logic devices LD and their control logic CL is achieved by multiple procedures:

STB with ControlBuild: Logic CL and services S are specified offline by using the ControlBuild Tool and then used on the STB;

PC gateway: Logic CL and Services S are fixedly programmed into this software (e.g., services from RFID antennas).

To start these services, a BootP/DHCP server must be used to assign IP addresses to the devices. In this case, a BootP server was used with a configuration file comprising all STBs.

The following table summarizes all the available logic devices and their properties:

| Physical Device | | Logic Device | Service | |
|---|---|---|---|---|
| ID | Procedure | Descriptor Name | Type | WSDL |
| C1-C11 | ControlBuild | 01MDST#1, 02MDSC#2, 03MDST#3, 04MDST#4, 05MDSC#5, 06MDST#6, 07MDST*7, 08MDSC#8, 09MDST#9, 10MDSC#10, 11MDSC#11 | transfer type/control | Transfer.wsdl |
| L1, L2 | ControlBuild | 01LIFTER#1, 02LIFTER#2 | Lifter type/control | Lifter.wsdl |
| RFIDs | PC Gateway | 02_OSITrack#2, 04_OSITrack#4, 06_OSITrack#6, 08_OSITrack#8 | OSITrack | OSITrack.wsdl |

To describe the services and make them usable for clients, more than one WSDL v1.1 (Web Services Descriptor Language) is used. The endpoints EP of the logic devices LD are associated with the corresponding service data listed below:

| WSDL | Operation | Type | Input Parameter | Output Parameter | Description |
|---|---|---|---|---|---|
| Transfer.wsdl | TransferIn | In/Out | direction(int) = 1, 2, 3 or 4 (input port) | response(int) = 0 (OK) = 1 (occupied) = 2 (unknown direction) = 3 (no pallet loaded) = 4 (pallet loaded) = 5 (answer error) | Starts a "Transfer In" procedure from the port indicated. Immediately sends confirmation of whether or not a query is possible. |
| | TransferStatus | Evout | | transferstatus(int) = 1 (occupied) = 5 (finished) = 666 (error) | An event is sent when a "Transfer In" process is started or terminated. |
| | TransferOut | In/Out | direction(int) = 1, 2, 3 or 4 (output port) | response(int) = 0 (OK) = 1 (occupied) = 2 (unknown direction) = 3 (no pallet loaded) = 4 (pallet loaded) = 5 (answer error) | Starts a "Transfer Out" process toward a stated port. Sends confirmation immediately about whether or not a query is possible. |

-continued

| WSDL | Operation | Type | Input Parameter | Output Parameter | Description |
|------|-----------|------|-----------------|------------------|-------------|
| | TransferStop | In/Out | | response(int) = 0 (OK) | Stops a "Transfer In/Out" process. Reason: The devices does not have any sensor capabilities to detect whether a pallet has left the conveyor of the device. |
| | GetStatus | In/Out | | response(int) = (3 no pallet loaded) = (4 pallet loaded) | Stops a "Transfer In/Out" process. Reason: The device does not have any sensor capabilities to detect whether a pallet has left the conveyor of the device. |
| Lifter.wsdl | IFtransferOUT | In/Out | IPtransferOutParam(short) = 1, 2, 3 or 4 | OPtransferOutStatus(short) = 1, 2, 3 or 4 (ok) = 111 (no pallet loaded) = 700 (occupied) | Starts a "Transfer Out" process toward a given port. Sends confirmation immediately of whether or not a query is possible |
| | IFgetStatus | In/Out | IPgetStatusParam(short) = 0 | OPgetStatusResponse(short) = 0 (no pallet loaded) = 11 (pallet loaded) = 15 (1 sensor) = 51 (1 sensor) | To receive the status from two conveyor sensors. Therefore it is possible to check on whether a completely loaded pallet (two sensors on), a partially loaded pallet (one sensor on) or no pallet (all sensors off) is present. |
| | OFlifterA/ OFlifterB | Evout | | OPlifterAstatus(short)/ OPlifterBstatus(short) = 10 (finished) = 700 (occupied) = 500 (manual) = 800 (terminated) | An event is sent when an operating process is started or terminated. |
| | IFinitialize | In/Out | IPinitializeParam(short) = 0 | OPinitializeStatus(short) = 1 (OK) = 10 (finished) = 500 (manual) = 700 (OK) = 800 (terminated) | Reference movement is executed. Should be performed each time at the start of the lifter operation. |
| | IFtransferStop | In/Out | IPtransferStopParam(short) = 0 | OPtransferStopStatus(short) = 10 (OK) | Stops a "Transfer In/Out" process. |
| | IFtransferin | In/Out | IPtransferInParam(short) = 1, 2, 3 or 4 | OPtransferInStatus(short) = 1, 2, 3 or 4 (ok) = 333 (pallet loaded) = 700 (occupied) | Starts a "Transfer In" process from a given port. Sends notification immediately of whether or not a query is possible. |
| | IFlifting | In/Out | IPliftingPos(short) = 1, 2, 3 or 4 (input/output port) | OPliftingStatus(short) = 1, 2, 3 or 4 (ok) = 500 (manual) = 700 (occupied) = 800 (terminated) | The conveyor is raised or lowered depending on the port selected. |
| OSITrack.wsdl | GetID | In/Out | | id(string) = unique ID of the RFID label | Sends a command to the module to read out the IP addresses. |
| | Write | In/Out | Registers2(Start(int), Amount(int), Value (string)) | Response(Identifier(int), Info(string)) | Writes to multiple registers (0-55 free on the label) |
| | Read | In/Out | Registers(Start(int), Amount(int)) | Response(Identifier(int), Info(string)) | Read multiple registers (0-55 free on label) |

Notes:
When using identification systems such as OSITrack, it is impossible to read/write multiple registers with the current PC gateway implementation. However, no data except for the ID of the label is used for this application and no user-defined data is written to or read out of the label.
Lifters must first be initialized before they can use other operations (even in Event Subscription).
TransferIn/TransferOut operations are stopped automatically (and send an event accordingly) if the pallet has been completely loaded/unloaded.
Manual placement of a pallet on a conveyer unit does not generate an event. The user must therefore initialize the process by retrieving the TransferOut(0) operation out of the orchestrator for the unit after the pallet has been placed.
After manual removal of a pallet from the conveyor unit, the TransferStop operation must be retrieved from the orchestrator to reset it at the device status.
WSDL, which was exported from ControlBuild tools, must be adapted because the type of port specified in the WSDL and the port offered by the service description are not the same.
The Device Descriptor Files DDF exported from ControlBuild are modified directly in the file system of the STB after deployment in order to set user-defined values for the device range and type.

The message sequence of the transfer units (conveyors) C1-C11 is expressed in FIG. 3 for the two operations TransferIn and TransferOut.

The message sequence of the lifters L1, L2 is supplied in FIG. 24 for the three operations IFtransferIn, IFtransferOut and IFlifting.

FIG. 25 shows the proposed service landscape, which is also available in the system. In addition to the "elementary" services S already explained, the orchestrators OE, which are distributed in the devices STB, and the Production Execution System PES (integrated into a PC) together with the external orders comprise the "heart" of an application because they act as the coordinator (composition and execution of services) and interface for the activities of the service-oriented automation and production components and processes.

Behavior models are generated as a function of the available elementary services S (and their operational procedures) as well as the assumed behavior of the devices. Editing processes of the control models were performed with the help of Continuum Development Studio.

The device approach and the interaction for each element are explained in FIG. 26.

FIG. 27 a) shows the orchestration of a transfer unit (top) and FIG. 27 b) shows the orchestration of a lifter (bottom).

Notes on FIG. 27 a) and b):
portin: Input port of the current orchestrator; portnext: input port of the next orchestrator; portout: output port of the current orchestrator; status=4: pallet loaded.
I/O: operation (parameter): Operational procedures for sending (O) or receiving (I) (from the standpoint of the server). If a message is to be received and has a parameter, there is a transition only if the parameters match.
For manual placement at WS1 and WS2, one should use I:TransferIn(11) or I:Transfer(12).
TransferStop must be retrieved when the pallet is removed manually.
The "occupied" response is given by the response O:TransferOut(portout) or the event O:TransferStatus(portout) with portout=101-111 (for conveyors), 112 and 113 (for lifters).
For manual checking of the "occupied" status and for removing the "stop workstation/resume workstation" function:

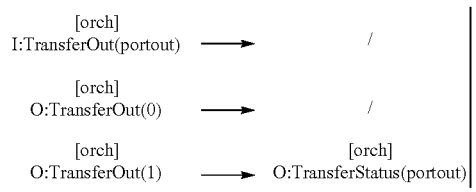

The manual placement/removal of the pallets must be preceded by a "get status" query to reset the sensor data of the conveyor units.
When there are multiple input ports and output ports, provide branch connections according to FIG. 27 c).
In decisions at the workstations (either allow the pallet to pass through or perform an operational procedure on it) and the conflict points at C4/C6 (which path to select), changes must be made in the central part at the site of the conflict. FIG. 27 d) shows an example of the workstation W1.

Conflicts are nodes in the Petri-Net-modeled system, where alternative paths are to be selected. This means that more than one transition may actually be switched. This corresponds to a situation in which decisions must be made.

In general, to retrieve the Decision Support System DSS at a point in the net, the pallet ID must first be queried via the OSITrack service procedure GetID. The parameter of the query (id>p"loaded".conflict_id) of the "loaded" part must be replaced with the ID of the location of the conflict (characterized in the example as "loaded"). Then the first places of each branch connection resulting from the conflict has a "services" property with values of the services leading to this branch, separated by commas. This example shows the service "ws1" which stops the pallet and waits until a TransferOut is given by the workstation W1 (after conclusion of the operational procedure involving the pallet) and a "standard" service for all other pallets which do not have any relationship to workstation 1. The responsible orchestration engine will stop at the "loaded" conflict in run time, will forward the pallet data to the Decision Support System DSS and will wait on a response (indicating which transition associated with a certain service is to be performed).

Changing from OFlifterA to OFlifterB when the model for the lifter corresponds to that of lifter B.
This orchestration (see FIG. 27) may be used for the following values:
normal transfer situations;
this conveyor is occupied;
the next conveyor is occupied;
manual pallet loading/unloading;
stop because of working activities or the like in the middle of the process.

The following table shows the details for modeling each Petri Net model and the corresponding device.

| Model | Type of model | Workstation (+manual placement/ removal of pallets) | Multiple I/O | Conflicts |
|---|---|---|---|---|
| C1, C3, C5, C7, C9, C10, C11 | transfer unit | no | no | no |
| C2, C8 | transfer unit | yes | no | yes |
| C4, C6 | transfer unit | no | yes | yes |
| L1, L2 | lifter | no | no | no |

Analysis and validation of models are performed by means of the analysis function of the Continuum Development Studio. The analysis is based on a check and confirmation of static and dynamic model properties. The validation is based on an isomorphism between the model properties and specifications of the modeled service-oriented automation and production components and processes. If the model has a transition invariance, for example, and a "liveliness property" then the transition invariance corresponds to the existence of a basic path (basic service composition/orchestration).

A separate inventive method for connecting behaviors/orchestration models and generating orchestration services is described below.

The orchestration models may be interconnected in two different ways via the ports:
Petri Net creator: The tool belonging to the Continuum Development System CDS makes it possible to generate a new model based on the connection of the individuals. For this connection, data must be placed in the Petri Net models, and it is necessary to define an XML connection file for describing which models are connected by which ports.
Mechanism for service query/response/event: This permits mutual communication of multiple orchestration engines and their respective models concerning the offer and use of services.

The connection strategy illustrated in FIG. 28 is used in this system. The composition tool is used to generate the model orchestration write (based on the models CM of the components C1-C3), orchestration middle (based on the models CM of the components C4-C5, L1, L2, C10, C11) and orchestration left (based on the models CM of the components C7-C9). The generated models communicate with one another (to perform transfer operational procedures of the pallets) by means of service retrieval ("TransferIn/TransferOut" mechanism).

For the sake of simplicity and also to demonstrate the composition function in a standard and reusable manner, the generated orchestration service implements the same transfer interface as the conveyors with a few particular features (see [orch] device, FIG. 27 *a*) and *b*)). Therefore, the orchestration services can be created just as progressively as the transfer units before them.

As soon as models are generated and validated, they can be used for configuration of the orchestration engine devices STB_PNE. This takes place by means of the Continuum Development System CDS and additional support to apply the data to the devices.

For the setup, only the application which responds in real time to the queries of the orchestration engine is executed.

The execution of the model is started on the basis of a service (transfer service) offered by the orchestration engine. Normally the execution starts immediately after deployment.

FIG. 31 shows the procedure for shutdown.

Details on the use cases:

Use of the Continuum Development Tool CDS and additional software for configuration of the automation system:

Design and analysis of the automation model in Petri Net formalism for conveyor modules.

Deployment in automation controls with embedded Petri Net orchestration engine.

Manual definition of production orders for pallets.

Placement of a pallet in the workstation (loading) and automatic forwarding to the desired workstation according to a production schedule.

Manual load command for a pallet by means of one of the workstations.

Execution of the behavior models which orchestrate individual conveyor devices and transport the pallets.

Solving conflicts at intersection nodes (alternative services are available) to which decision queries are directed on arrival of the pallet at the Production Execution System. Production execution then gives the correct direction of the pallet as a response (in retrieving one and only one of a corresponding service from one of the possible available services) which then activates the specific logic and brings the pallet to the desired destination.

The pallet arrives at the workstation and can be stopped for operating purposes.

Placement of a second pallet and mutual orchestration of both pallets:

The same procedure as with the first pallet but with a different work schedule.

If the pallets intersect in this way (try an inquiry to the same transport module), the orchestration will automatically process the pallet arriving first and will wait for the second until the transport of the first is concluded.

The following table shows the functions that can be executed with the given approach and the proposed tools.

| Functions |
|---|
| 1. EMBEDDING WEB SERVICES IN INDUSTRIAL CONTROLS: |
| 1.1. Encapsulated device functionality through web services and embedded industrial controls (Schneider STB I/O device) through DPWS stack. |
| 1.2. Control of obsolete devices with service gateways (PC-based, for OSITrack RFID readers). |
| 2. SERVICE ORCHESTRATION: |

| Functions |
|---|
| 2.1. Model-based orchestration engines (Petri Net, higher level) embedded in industrial controls (Schneider STB I/O device). |
| 2.2. Service orchestration at a low level while maintaining the topology of the mechatronic devices hosting these services. |
| 3. CONFLICT RESOLUTION BY A PRODUCTION EXECUTION SYSTEM: |
| 3.1. Decision support at the point of conflict based on local data (services offered by mechatronic devices) and on the basis of data of a higher level (services offered pertaining to ongoing production orders and requests). |
| 4. BUSINESS INTEGRATION THROUGH WEB SERVICE INTERFACES: |
| 4.1. Updates of production orders and order status are sent from the ERP/MES system to the work system. |
| 4.2. Multi-corporate integration through cross layer and event-based architecture (SIA) for devices embedded in networks. |

According to a third inventive idea, the invention is based on a model-based Service Orchestration Engine associated with a Decision Support System.

The model-based Service Orchestration Engine utilizes a Petri Net dialect as the modeling and logic language: High-Level Petri Net (HL-PN). The HL-PN was expanded by adding elements for MAPPING web-service-specific properties directly ONTO the HL-PN model: service and data contracts as well as configuration of the DPWS discovery. However, these models may also be expanded by adding additional properties. In addition to DPWS-compatible web services, other message- and/or event-oriented communication layers may also be configured.

Petri Nets are suitable for mapping competing and concurrent processes with distributed resources, which operate on a limited amount of hardware and software resources. The fundamental approach is to model each component of a system individually and furnish it with logic interfaces that allow (automated) composition of the model components to form an overall static model of the system. The model instances are then interconnected in accordance with the actual topology of the system. Due to the fact that the component models supply all the interfaces, the overall model contains all possible sequence paths in principle. On the example of a material flow system, this means that a system consisting of transport components will contain all flow paths that also permit physical transport of material by connecting the transport elements. In the trivial case, the system may contain linear paths and the process may thus take place more or less sequentially, but in more complex compositions, the process might contain a few paths having multiple bifurcations and connections, so that alternative sequence paths may be selected in run time. The bifurcations and connections in such complex processes are modeled as conflict nodes in the Petri Net. Conflicts in a Petri Net model may have different meanings in a real system. For example, a pallet could be transported on a transport element in various directions or two subprocesses might "compete" for the same resource.

Some problems can be solved by simple algorithms, e.g., random selection of a process path, but such approaches are not efficient from a global standpoint or they may even be harmful for certain topologies because deadlocks occur there and the process is blocked. It is thus clear that subprocesses may be synchronized to a limited extent not only locally but also in an expanded context. These problems are not new and are at least partially solved by Enterprise Resource Planning ERP/Production Execution System (MES) [sic; PES].

For the orchestration engine and an "orchestrated" system of services, an architecture that enables a separation of the decision algorithms and the service orchestration was selected. There is a special interface between the orchestration engine and the so-called Decision Support System to exchange decision questions, answers and metadata for decision making. At the orchestration level, so-called local decisions are made based on simple algorithms and they intervene, for example, to resolve conflicts quickly when the higher-level Decision Support System (DSS) has not made a decision. Thus at a lower level decisions which are based purely on knowledge of the models and the current status of the models are made.

From the standpoint of orchestration (bottom-up), the DSS encapsulates the upper systems as a service for decision making without knowing which algorithms the decision is based on.

From the standpoint of Enterprise Resource Planning (ERP) (top-down), the DSS encapsulates the production, i.e., manufacturing system as a Manufacturing Execution System (MES) service with interfaces for receipt of production orders and for production monitoring. The ERP system has no detailed knowledge of the automation processes but has knowledge only about production orders and their status.

Example according to FIGS. 33 and 34: For an electronic assembly production system PS a Production Execution System PES component (production execution=PE) which supplies an interface DSS_I for the service orchestration OE and the interface ERP_I for an Enterprise Resource Planning System ERP was developed. An ERP system is thus capable of sending production orders to the Production Execution System PES. The production system uses pallets P, which can send unfinished products to various workstations W1, W2 for processing. The "conflict nodes" in the model refer to, among other things, the locations where transport elements C1-C11 have multiple inputs and outputs and can carry pallets P to different workstations W1, W2. The production system PS detects and identifies pallets P based on RFID tags OSI containing the pallet ID. With the help of the pallet ID, at conflict points, the production system PS can ask the Production Execution System PES via the DSS interface where the pallet is to be sent. The Production Execution System PES has identified the product belonging to the pallet P, its processing status and the next working steps on the basis of knowledge of all ongoing orders, all production processes, the utilization of the workstations (instantaneous and planned), the availability of production resources, so the Production Execution System PES can decide to which workstation the product is to be sent.

ABBREVIATIONS

API Application Programming Interface
BPEL Business Process Execution Language
BPML Business Process Management Language
CMIP Common Management Information Protocol
CMIS Common Management Information Services
CPU Central Processing Unit
DPWS Devices Profile for Web Services
DSS Decision Support System
DTD Document Type Definition
ERP Enterprise Resource Planning
FIPA Foundation for Intelligent Physical Agents
HTTP Hypertext Transfer Protocol
IP Internet Protocol
MAS Multi-Agent System
OPC Open Connectivity, ehemals "OLE for Process Control"
OPC-UA OPC Unified Architecture
OWL Web Ontology Language
OWL-S Upper Ontology for Semantic Web Services
QoS Quality of Service
RFID Radio-Frequency IDentification
SOA Service-oriented Architecture
SOAP ehemals Simple Object Access Protocol
SWRL Semantic Web Rule Language
SWS Semantic Web Services
SWSO Semantic Web Service Ontology
TCP Transport Control Protocol
UDP User Datagram Protocol
UML Unified Modeling Language
URI Uniform Resource Identifier Web Based Enterprise Management
WS—Business Process Execution Language
BPEL for Web Services
WSCI Web Services Choreography Interface
WSDL Web Service Description Language
WSDM Web Services Distributed Management
WSMO Web Service Modeling Ontology
WSO Web Service Orchestration
WSOL Web Service Orchestration Language
XML eXtensible Markup Language

The invention claimed is:

1. A method for configuration of SOA-based automation devices having an embedded High-Level Petri Net Orchestration Engine for controlling mechatronic components of an automation system, comprising the process steps:
   generation of HLPN component models for each type of mechatronic component of the automation system,
   creation of a Component Instance Model from an HLPN component model for each physically present mechatronic component,
   creation of a Layout Configuration File, which describes relationships among the Component Instance Models,
   composition of the Component Instance Models to form at least one System Model based on the Layout Configuration File, such that logic ports of the Component Instance Models are interconnected/linked to one another,
   generation of Configuration Files based on the at least one System Model as well as Device Descriptor Files and WSDL files of the Component Instance Models, such that the configuration files include at least one Device Configuration File and one Service Configuration File,
   loading the configuration files into the automation device containing the HLPN orchestration engine, wherein the configuration file comprises data on hosted service information with the required discovery hints or a service endpoint address for the HLPN orchestration engine to resolve referenced component services, and the device configuration file has a service class descriptor with referenced types of ports and a model representation,
   execution of the configuration files by the distributed HLPN orchestration engines of the automation devices.

2. The method according to claim 1, wherein an XML-based file such as an XRC file is used as the Layout Configuration File.

3. The method according to claim 1 wherein the Layout Configuration File is created manually or automatically, preferably by using a text editor.

4. The method according to claim 1, wherein a single component model is created for each mechatronic component, each model instance being configured with a correct and binding reference name.

5. The method according to claim 1, wherein the Device Descriptor Files establish a 1:1 link between the binding reference names of the models and the actual DPWS devices/services.

6. The method according to claim 1 wherein all the DPWS devices present in the system are detected manually or by means of a network scan operation, wherein local Device Descriptor Files are acquired with the type of device, operational use, address and descriptive names.

7. The method according to claim 1, wherein a link to the binding reference name is created by renaming the respective device file.

8. The method according to claim 1, wherein the system model being used is represented as a DPWS device, wherein a Device Descriptor File is generated by a Template Generator Batch File.

9. The method according to claim 1, wherein the files are hosted on an HTTP web server, and the files are accessed via the URL.

10. The method according to claim 1, wherein the Component Instance Model is created by copying the Device Type Model and adjusting a reference name according to a Device Descriptor File Name, which is associated with the device instance.

11. The method according to claim 1, wherein the automation device or the simulator is identified with a device UUID and/or contains and/or requires the DPWS-capable devices implemented in the automation device.

12. A manufacturing method for manufacturing products by the cooperation of a plurality of mechatronic components and/or devices such as transport units, lifters or workstations,
    wherein a group of automation devices and/or devices or a mechatronic component and/or device is/are controlled an automation device,
    wherein the automation devices communicate via a network with one another and with a Production Execution System in a service-oriented manner,
    wherein the automation device assigned to a mechatronic component and/or device or to a group of mechatronic components and/or devices is configured such that the mechatronic components and/or the device or the group of mechatronic components and/or devices can be offered and retrieved as a logic device, and functions of the mechatronic component and/or device or the group of mechatronic components and/or devices can be retrieved as an elementary service in the network,
    wherein at least two Service Orchestration Engines re provided for implementing the manufacturing method, each Service Orchestration Engine being configured such that elementary services of one group of mechatronic components and/or devices which belong together from the standpoint of manufacturing technology are orchestrated and represented in the network on the basis of interconnected and/or synchronized orchestration and/or behavior models,
    wherein the orchestration and/or behavior models are interconnected via ports, such that a model based on the linking of individual behavior models of groups of mechatronic components is generated, data being inserted into the underlying Petri Net models for the linking of the models, and a linking file such as an XML file is defined, in which there is a description of which models are connected over which ports, and
    wherein the orchestration models are interconnected via ports, such that mutual communication of multiple Orchestration Engines and their respective models is performed by offering and utilizing services via a service inquiry/response/event mechanism.

* * * * *